(12) United States Patent
Byun

(10) Patent No.: US 11,513,946 B2
(45) Date of Patent: Nov. 29, 2022

(54) MEMORY CONTROLLER GENERATING MAPPING DATA AND METHOD OF OPERATING THE SAME

(71) Applicant: SK hynix Inc., Gyeonggi-do (KR)

(72) Inventor: Eu Joon Byun, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 170 days.

(21) Appl. No.: 16/588,464

(22) Filed: Sep. 30, 2019

(65) Prior Publication Data

US 2020/0264972 A1 Aug. 20, 2020

(30) Foreign Application Priority Data

Feb. 15, 2019 (KR) .......................... 10-2019-0018099

(51) Int. Cl.
| | | |
|---|---|---|
| G06F 12/00 | (2006.01) | |
| G06F 12/02 | (2006.01) | |
| G06F 12/0873 | (2016.01) | |
| G06F 9/48 | (2006.01) | |
| G06F 13/16 | (2006.01) | |

(52) U.S. Cl.
CPC ........ G06F 12/0246 (2013.01); G06F 9/4881 (2013.01); G06F 12/0873 (2013.01); G06F 13/1668 (2013.01); *G06F 2212/7201* (2013.01)

(58) Field of Classification Search
CPC ............ G06F 12/0246; G06F 12/0873; G06F 9/4881; G06F 13/1668; G06F 2212/7201; G06F 2212/7205; G06F 12/0253; G06F 12/0646; G06F 3/06; G06F 3/0658; G06F 3/064; G06F 3/0652; G06F 3/0679
See application file for complete search history.

(56) References Cited

U.S. PATENT DOCUMENTS

| | | | | |
|---|---|---|---|---|
| 2017/0300422 | A1* | 10/2017 | Szubbocsev | ............ G06F 12/10 |
| 2019/0220396 | A1* | 7/2019 | Lin | ...................... G06F 12/1009 |
| 2020/0105354 | A1* | 4/2020 | Helmick | ................ G11C 16/22 |

FOREIGN PATENT DOCUMENTS

| | | |
|---|---|---|
| KR | 10-2008-0009314 | 1/2008 |
| KR | 10-2017-0035155 | 3/2017 |

* cited by examiner

Primary Examiner — Shawn X Gu
(74) Attorney, Agent, or Firm — IP & T Group LLP

(57) ABSTRACT

A memory controller includes a mapping data control unit configured to interrupt the generation of the additional mapping data, when during generation of additional mapping data, an operation for an address identical to a logical block address in the additional mapping data is performed, and to generate dummy mapping data. The additional mapping data may include mapping information indicating a mapping relationship between a logical block address and a physical block address.

20 Claims, 16 Drawing Sheets

FIG. 3A

| MAPPING DATA TYPE | Mapping_DATA | Logical Block Address, LBA | Physical Block Address, PBA |
|---|---|---|---|
| NORMAL MAPPING DATA | Mapping_DATA1 | LBA1 | PBA1 |
| | Mapping_DATA2 | LBA2 | PBA2 |

FIG. 3B

| MAPPING DATA TYPE | Mapping_DATA | Logical Block Address, LBA | Physical Block Address, PBA | ADDITIONAL FIELD |
|---|---|---|---|---|
| ADDITIONAL MAPPING DATA | Mapping_DATA3 | LBA3 | PBA3 | k3 |
| | Mapping_DATA4 | LBA4 | PBA4 | k4 |

| MAPPING DATA TYPE | MAPPING DATA (Mapping_DATA) |
|---|---|
| NORMAL MAPPING DATA | Mapping_DATA1 |
|  | Mapping_DATA2 |
| ADDITIONAL MAPPING DATA | Mapping_DATA3 |
|  | Mapping_DATA4 |
| DUMMY MAPPING DATA | DM_DATA1 |
|  | DM_DATA2 |

MEMORY CONTROLLER GENERATING MAPPING DATA AND METHOD OF OPERATING THE SAME

CROSS-REFERENCE TO RELATED APPLICATION

The present application claims priority under 35 U.S.C. § 119(a) to Korean patent application number 10-2019-0018099, filed on Feb. 15, 2019, which is incorporated herein by reference in its entirety.

BACKGROUND

Field of Invention

Various embodiments of the present disclosure generally relate to an electronic device, and more particularly, to a memory controller and a method of operating the memory controller.

Description of Related Art

Generally, a storage device stores data under control of a host device such as a computer, a smartphone, or a smartpad. According to the type of device provided to store data, examples of the storage device may be classified into a device such as a hard disk drive (HDD) which stores data in a magnetic disk, and a device such as a solid state drive (SSD) or a memory card which stores data in a semiconductor memory, particularly, a nonvolatile memory.

A storage device may include a memory device in which data is stored, and a memory controller configured to store data in the memory device. Memory devices may be classified into volatile memories and nonvolatile memories. Representative examples of the nonvolatile memories may include a read only memory (ROM), a programmable ROM (PROM), an electrically programmable ROM (EPROM), an electrically erasable programmable ROM (EEPROM), a flash memory, a phase-change random access memory (PRAM), a magnetic RAM (MRAM), a resistive RAM (RRAM), and a ferroelectric RAM (FRAM).

SUMMARY

Various embodiments of the present disclosure are directed to a memory controller which is capable of generating mapping data having improved reliability, and a method of operating the memory controller.

An embodiment of the present disclosure may provide for a memory controller configured to control a memory device, the memory controller comprising, a mapping data control unit configured to interrupt the generation of the additional mapping data, when during generation of additional mapping data, an operation for an address identical to a logical block address in the additional mapping data is performed, and to generate dummy mapping data, wherein the additional mapping data includes mapping information indicating a mapping relationship between a logical block address and a physical block address.

An embodiment of the present disclosure may provide for a method of operating a memory controller configured to control a memory device, the method comprising, generating additional mapping data, receiving, during the generation of the additional mapping data, an operation request and a logical block address corresponding to the operation request and interrupting the generation of the additional mapping data and generating dummy mapping data, based on the operation request and a logical block address corresponding to the operation request, wherein the additional mapping data includes mapping information indicating a mapping relationship between a logical block address and a physical block address.

An embodiment of the present disclosure may provide for a storage device comprising a memory device and a memory controller suitable for generating additional mapping data including mapping information indicating a mapping relationship between a logical block address from a host and a physical block address of the memory device, during the generating of the additional mapping data, detecting whether an operation request for the memory device corresponding to the logical block address is received from the host, when it is detected that the operation request is received, stopping the generating of the additional mapping data and generating dummy mapping data including invalid mapping data.

BRIEF DESCRIPTION OF THE DRAWINGS

FIGS. 3A and 3B are block diagrams illustrating normal mapping data and additional mapping data in accordance with an embodiment of the present disclosure.

DETAILED DESCRIPTION

Figure 1:
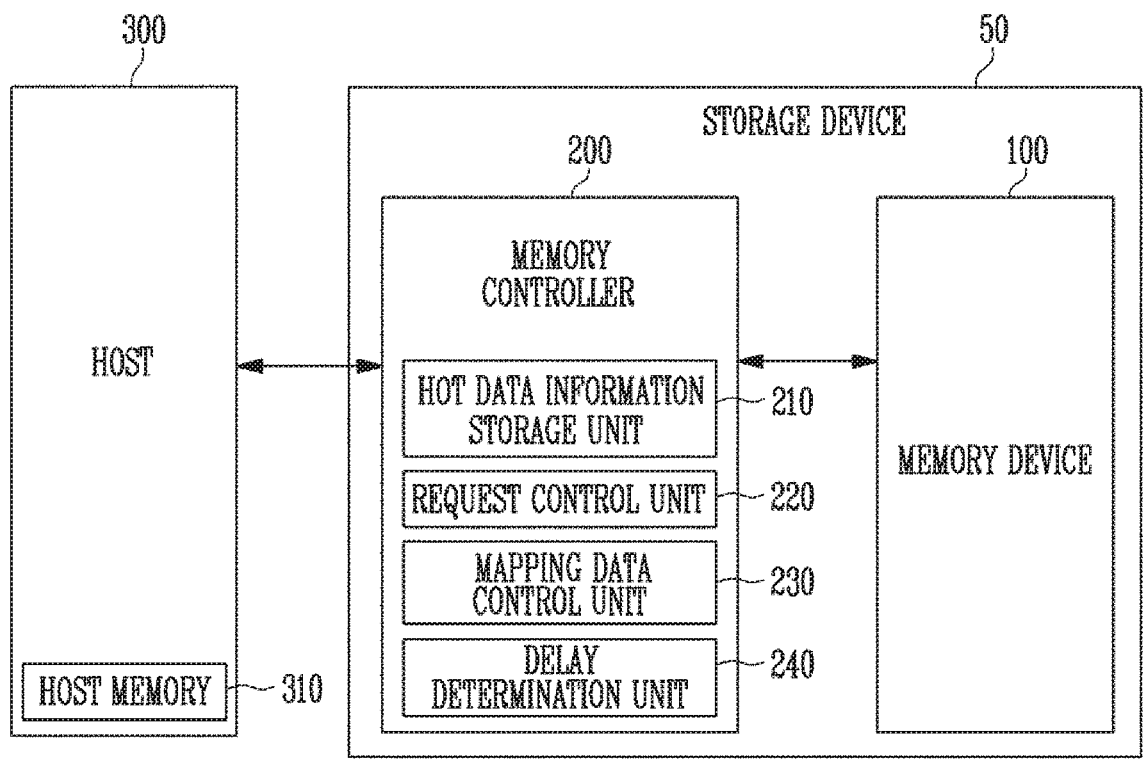
FIG. 1 is a block diagram illustrating a storage device in accordance with an embodiment of the present disclosure.

Specific structural or functional descriptions in the embodiments of the present disclosure introduced in this specification or application are only for description of the embodiments of the present disclosure. The descriptions should not be construed as being limited to the embodiments described in the specification or application.

The present disclosure will now be described in detail based on embodiments. The present disclosure may, however, be embodied in many different forms and should not be construed as being limited to only the embodiments set forth herein, but should be construed as covering modifications, equivalents or alternatives falling within ideas and technical scopes of the present disclosure. However, it is to be understood that the present description is not intended to limit the present disclosure to those exemplary embodiments, and the present disclosure is intended to cover not only the exemplary embodiments, but also various alternatives, modifications, equivalents and other embodiments that fall within the spirit and scope of the present disclosure.

It will be understood that, although the terms "first", "second", etc. may be used herein to describe various elements, these elements should not be limited by these terms. These terms are only used to distinguish one element, from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that describe the relationship between elements, such as "between", "directly between", "adjacent to" or directly adjacent to" should be construed in the same way.

The terminology used herein is for the purpose of describing particular embodiments only and is not intended to be limiting. In the present disclosure, the singular forms are intended to include the plural forms as well, unless the context clearly indicates otherwise. It will be further understood that the terms "comprise", "include", "have", etc. when used in this specification, specify the presence of stated features, integers, steps, operations, elements, components, and/or combinations thereof but do not preclude the presence or addition of one or more other features, integers, steps, operations, elements, components, and/or combinations thereof.

Unless otherwise defined, all terms including technical and scientific terms used herein have the same meaning as commonly understood by one of ordinary skill in the art to which the present disclosure belongs. It will be further understood that terms used herein should be interpreted as having a meaning that is consistent with their meaning in the context of this specification and the relevant art, and will not be interpreted in an idealized or overly formal sense unless expressly so defined herein.

Detailed description of functions and structures well known to those skilled in the art will be omitted to avoid obscuring the subject matter of the present disclosure. This aims to omit unnecessary description so as to make the subject matter of the present disclosure clear.

Various embodiments of the present disclosure will now be described more fully hereinafter with reference to the accompanying drawings, in which preferred embodiments of the present disclosure are shown, so that those of ordinary skill in the art can easily carry out the technical idea of the present disclosure.

FIG. 1 is a block diagram illustrating a storage device 50 in accordance with an embodiment of the present disclosure.

Referring to FIG. 1, the storage device 50 may include a memory device 100 and a memory controller 200.

The storage device 50 may be a device configured to store data under control of a host 300 such as a cellular phone, a smartphone, an MP3 player, a laptop computer, a desktop computer, a game machine, a television (TV), a tablet personal computer (PC), or an in-vehicle infotainment system.

The storage device 50 may be manufactured as any one of various types of storage devices depending on a host interface, which is a communication system with the host 300. For example, the data storage device 50 may be configured of any one of various types of storage devices such as an SSD, MMC, eMMC, RS-MMC, or micro-MMC type multimedia card, an SD, mini-SD, micro-SD type secure digital card, a universal serial bus (USB) storage device, a universal flash storage (UFS) device, a personal computer memory card international association (PCMCIA) card type storage device, a peripheral component interconnection (PCI) card type storage device, a PCI-express (PCI-E) type storage device, a compact flash (CF) card, a smart media card, and a memory stick.

The storage device 50 may be manufactured in the form of any one of various package types. For instance, the storage device 50 may be manufactured in the form of any one of various package types such as a package on package (POP) type, a system in package (SIP) type, a system on chip (SOC) type, a multi-chip package (MCP) type, a chip on board (COB) type, a wafer-level fabricated package (WFP) type, and a wafer-level stack package (WSP) type.

The memory controller 200 may control overall operations of the storage device 50.

When power is applied to the storage device 50, the memory controller 200 may execute firmware. In the case where the memory device 100 is a flash memory device, the memory controller 200 may execute firmware such as a flash translation layer (FTL) for controlling communication between the host 300 and the memory device 100.

The memory controller 200 may include a hot data information storage unit 210. The hot data information storage unit 210 may store hot data information HD_INF. The hot data information HD_INF may include information about logical block addresses LBA received a predetermined number of times or more from the host 300. The hot data information HD_INF may be updated each time the hot data information HD_INF is changed. Furthermore, the hot data information HD_INF may be periodically updated. Alternatively, the hot data information HD_INF may be updated in response to a request of the host 300. When the hot data information HD_INF is updated, the hot data information storage unit 210 may store the updated hot data information. Subsequently, the hot data information storage unit 210 may provide the updated hot data information to the host 300 and/or a request control unit 220.

In an embodiment, the memory controller 200 may generate additional mapping data based on the hot data information HD_INF. The additional mapping data may include normal mapping data and an additional field. The additional field may store the number of times the additional mapping data has been updated or data for error correction. Although the memory controller 200 may generate the additional mapping data in response to an additional mapping data request received from the host 300, the memory controller 200 may internally perform an operation of generating additional mapping data without an additional mapping data request.

The memory controller 200 may include the request control unit 220. The request control unit 220 may receive a request from the host 300. The request may be any one of a normal mapping data request, an additional mapping data request, and an operation request.

In an embodiment, the normal mapping data request may be a request for generating normal mapping data. The normal mapping data may include mapping information indicating a mapping relationship between a logical block address LBA and a physical block address PBA. The additional mapping data request may be a request for generating additional mapping data. The additional mapping data may include mapping information indicating a mapping relationship between a logical block address LBA and a physical block address PBA, and an additional field. The operation request may be any one of a program request and an erase request for controlling the operation of the memory device 100.

The request control unit 220 may generate decision information DC_INF including a request received from the host 300 and information about a logical block address LBA corresponding to the request received from the host 300. The request of the host 300 may be a request for storing additional mapping data in a host memory 310.

The request control unit 220 may output the generated decision information DC_INF to the mapping data control unit 230. The mapping data control unit 230 may generate mapping data based on the decision information DC_INF.

The memory controller 200 may include a mapping data control unit 230. The mapping data control unit 230 may generate mapping data based on a request received from the host 300. In an embodiment, the request received from the host 300 may be an additional mapping data request or a normal mapping data request.

In various embodiments, when a request is received from the host 300, the request control unit 220 may generate decision information DC_INF corresponding to the request. The decision information DC_INF may be information for generating mapping data including a logical block address LBA corresponding to the request. When the mapping data control unit 230 receives the decision information DC_INF, the mapping data control unit 230 may generate either normal mapping data or additional mapping data.

In the case where the request received from the host 300 is a normal mapping data request, the mapping data control unit 230 may generate normal mapping data. The normal mapping data may include mapping information indicating a mapping relationship between a logical block address LBA and a physical block address PBA. The normal mapping data may not include an additional field.

In the case where the request received from the host 300 is an additional mapping data request, the mapping data control unit 230 may generate additional mapping data. The additional mapping data may be mapping data including a logical block address LBA corresponding to the hot data information HD_INF. The hot data information HD_INF may include information about logical block addresses LBA received a predetermined number of times or more from the host 300. In an embodiment, the memory controller 200 may determine the hot data information HD_INF.

The memory controller 200 may include a delay determination unit 240. The delay determination unit 240 may detect whether generation of mapping data to be generated by the memory controller 200 is delayed. The delay determination unit 240 may detect a change in state of the memory controller 200 and output information for interrupting the mapping data generation of the mapping data control unit 230.

In various embodiments, when the memory controller 200 preferentially performs another command, the generation of mapping data may be delayed. In this case, the delay determination unit 240 may output delay information DELAY_INF to the mapping data control unit 230. When the mapping data control unit 230 receives the delay information DELAY_INF, the mapping data control unit 230 may interrupt the generation of mapping data and output dummy mapping data DM_DATA to the host 300.

The memory device 100 may store data therein. The memory device 100 may operate under control of the memory controller 200. The memory device 100 may include a memory cell array including a plurality of memory cells configured to store data therein. The memory cell array may include a plurality of memory blocks. Each memory block may include a plurality of memory cells. Each memory block may include a plurality of pages. In an embodiment, each page may be the unit of storing data in the memory device 100 or reading stored data from the memory device 100. Each memory block may be the unit of erasing data.

In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory device, a resistive random access memory (RRAM), a phase-change memory (PRAM), a magnetoresistive random access memory (MRAM), a ferroelectric random access memory (FRAM), or a spin transfer torque random access memory (STT-RAM). In this specification, the memory device 100 is a NAND flash memory.

In an embodiment, the memory device 100 may be embodied in a three-dimensional array structure. The present disclosure may be applied not only to a flash memory in which a charge storage layer is formed of a conductive floating gate (FG), but also to a charge trap flash (CTF) memory in which a charge storage layer is formed of an insulating layer.

In an embodiment, each of the memory cells in the memory device 100 may be formed of a single-level cell (SLC) capable of storing one bit of data. Alternatively, each of the memory cells included in the memory device 100 may be formed of a multi-level cell (MLC) capable of storing two bits of data, a triple-level cell (TLC) capable of storing three bits of data, or a quad-level cell (QLC) capable of storing four bits of data.

The memory device 100 may receive a command and an address from the memory controller 200 and access an area of the memory cell array that is selected by the address. The memory device 100 may perform an operation corresponding to the command on the region selected by the address. For example, the memory device 100 may perform a write (or program) operation, a read operation, and an erase operation. During a program operation, the memory device 100 may program data to an area selected by an address. During a read operation, the memory device 100 may read data from an area selected by an address. During an erase operation, the memory device 100 may erase data from an area selected by an address.

The memory device 100 may perform a program operation or an erase operation using a set operating voltage under control of the memory controller 200.

In an embodiment, the memory controller 200 may receive data and a logical block address LBA from the host 300. Further, the memory controller 200 may translate the logical block address LBA into a physical block address PBA indicating addresses of memory cells in which data is to be stored, the memory cells being included in the memory device 100. In addition, the memory controller 200 may store, in a buffer memory, mapping information indicating a mapping relationship between the logical block address LBA and the physical block address PBA.

The memory controller 200 may control the memory device 100 to perform a program operation, a read operation, or an erase operation in response to a request from the host 300. During a program operation, the memory controller 200 may provide a program command, a physical block address PBA, and data to the memory device 100. During a read operation, the memory controller 200 may provide a read command and a physical block address PBA to the memory device 100. During an erase operation, the memory controller 200 may provide an erase command and a physical block address PBA to the memory device 100.

In an embodiment, the memory controller 200 may autonomously generate a program command, an address and data without a request from the host 300, and transmit them to the memory device 100. For example, the memory controller 200 may provide a command, an address and data to the memory device 100 to perform background operations such as a program operation for wear leveling, and a program operation for garbage collection.

In an embodiment, the memory controller 200 may control at least two or more memory devices 100. In this case, the memory controller 200 may control the memory devices 100 in an interleaving manner so as to enhance the operating performance.

The host 300 may communicate with the storage device 50 using at least one of various communication methods such as universal serial bus (USB), serial AT attachment (SATA), serial attached SCSI (SAS), high speed interchip (HSIC), small computer system interface (SCSI), peripheral component interconnection (PCI), PCI express (PCIe), non-volatile memory express (NVMe), universal flash storage (UFS), secure digital (SD), multimedia card (MMC), embedded MMC (eMMC), dual in-line memory module (DIMM), registered DIMM (RDIMM), and load reduced DIMM (LRDIMM) communication methods.

The host 300 may include a host memory 310. The host memory 310 may store mapping data received from the mapping data control unit 230. The mapping data received from the mapping data control unit 230 may be additional mapping data.

When outputting a read request, the host 300 may output additional mapping data along with the read request. The read request may be a read request for specific data stored in the memory device 100. The additional mapping data may include mapping data corresponding to the read request. When the host 300 outputs the additional mapping data to the memory controller 200, the memory controller 200 may determine whether to use the additional mapping data. The memory controller 200 may determine whether to use the additional mapping data, based on data in the additional field of the additional mapping data.

Figure 2:
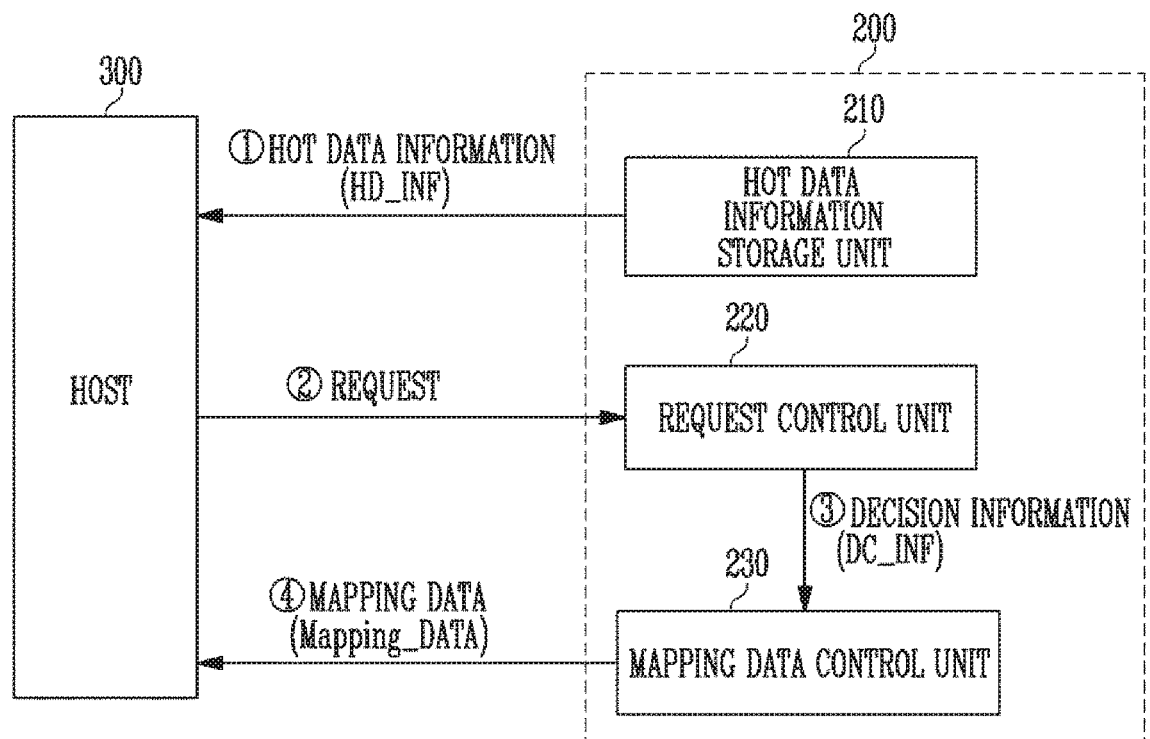
FIG. 2 is a diagram illustrating the configuration of a memory controller of FIG. 1 and a method of generating normal mapping data and additional mapping data in accordance with an embodiment of the present disclosure.

FIG. 2 is a diagram illustrating the configuration of a memory controller (e.g., the memory controller 200 of FIG. 1) and a method of generating normal mapping data and additional mapping data in accordance with an embodiment of the present disclosure.

Referring to FIG. 2, the memory controller 200 may include the hot data information storage unit 210, the request control unit 220, and the mapping data control unit 230. In FIG. 2, it is noted that the delay determination unit 240 in the memory controller 200 is omitted.

The hot data information storage unit 210 may store hot data information HD_INF. The hot data information HD_INF may include information about frequencies of access of the host 300 and the memory controller 200. In an embodiment, the hot data information HD_INF may include information about logical block addresses LBA received a predetermined number of times or more from the host 300.

The hot data information HD_INF may be updated each time the hot data information HD_INF is changed. The hot data information HD_INF may be determined depending on the number of times an identical logical block address LBA has been received from the host 300. When the number of times the identical logical block address LBA has been received is increased or decreased, the hot data information HD_INF may be changed. The hot data information HD_INF may be periodically updated. Alternatively, the hot data information HD_INF may be updated in response to a request of the host 300.

When the hot data information HD_INF is updated, the hot data information storage unit 210 may store the updated hot data information. Subsequently, the hot data information storage unit 210 may provide the updated hot data information to the host 300 and/or the request control unit 220.

In FIG. 2, the hot data information HD_INF has not been updated.

The hot data information storage unit 210 may output the hot data information HD_INF to the host 300 (①). The host 300 may output a request to the request control unit 220 based on the hot data information HD_INF (②). The host 300 may output a request for generating mapping data including a logical block address LBA in the hot data information HD_INF. The request for generating the mapping data including the logical block address LBA in the hot data information HD_INF may be an additional mapping data request.

In an embodiment, the host 300 may output, to the request control unit 220, a request for generating mapping data including a logical block address, other than the logical block address LBA in the hot data information HD_INF (②). The request for generating the mapping data including the logical block address, other than the logical block address LBA in the hot data information HD_INF, may be a normal mapping data request.

The request control unit 220 may output decision information DC_INF based on the request received from the host 300 (③). In various embodiments, the request control unit 220 may generate decision information DC_INF including information about the request received from the host 300 and the logical block address LBA corresponding to the request received from the host 300.

The request received from the host 300 may be any one of a normal mapping data request and an additional mapping data request. The decision information DC_INF may include information about the type of request received from the host 300 and the logical block address LBA corresponding to the request.

In various embodiments, when the request received from the host 300 is a normal mapping data request, the request control unit 220 may generate decision information DC_INF including a logical block address LBA corresponding to the normal mapping data request. When the request received from the host 300 is an additional mapping data request, the request control unit 220 may generate decision information DC_INF including a logical block address LBA corresponding to the additional mapping data request. The request control unit 220 may output the decision information DC_INF to the mapping data control unit 230.

In an embodiment, the request control unit 220 may output decision information DC_INF based on the hot data information HD_INF stored in the hot data information storage unit 210, without receiving a request from the host 300. The request control unit 220 may perform an operation of internally generating additional mapping data in the memory controller 200 based on the hot data information HD_INF, regardless of a request of the host 300. In this case, the request control unit 220 may generate decision information DC_INF including a logical block address LBA required to generate additional mapping data.

The mapping data control unit 230 may generate mapping data Mapping_DATA based on the decision information DC_INF received from the request control unit 220.

In an embodiment, when the logical block address in the decision information DC_INF is a logical block address corresponding to the normal mapping data request, the mapping data control unit 230 may generate normal mapping data. The mapping data generated by the mapping data control unit 230 based on the decision information DC_INF may be normal mapping data. The normal mapping data may be mapping data including a logical block address, other than the logical block address LBA in the hot data information HD_INF.

The normal mapping data may include mapping information indicating a mapping relationship between a logical block address LBA and a physical block address PBA. The normal mapping data may not include an additional field.

In an embodiment, when the logical block address LBA in the decision information DC_INF is a logical block address corresponding to the additional mapping data request, the mapping data control unit 230 may generate additional mapping data. The mapping data generated by the mapping data control unit 230 based on the decision information DC_INF may be additional mapping data. The additional mapping data may be mapping data including a logical block address LBA in the hot data information HD_INF.

The additional mapping data may include mapping information indicating a mapping relationship between a logical block address LBA and a physical block address PBA, and an additional field. The number of times the additional mapping data has been updated or data for error correction may be stored in the additional field.

When the mapping data control unit 230 generates additional mapping data, the mapping data control unit 230 may output additional mapping data to the host 300 (④). Therefore, the mapping data Mapping_DATA output from the mapping data control unit 230 may be additional mapping data.

When additional mapping data corresponding to the additional mapping data request received from the host 300 is generated, the mapping data control unit 230 may output the additional mapping data to the host 300. In contrast, when normal mapping data corresponding to the normal mapping data request received from the host 300 is generated, the mapping data control unit 230 may not output the normal mapping data to the host 300. The host 300 may store, in the host memory 310, the additional mapping data received from the mapping data control unit 230.

In an embodiment, the mapping data control unit 230 may generate additional mapping data without an additional mapping data request from the host 300. The additional mapping data may be generated based on the hot data information HD_INF.

Although the mapping data control unit 230 may generate additional mapping data according to decision information DC_INF generated based on a request received from the host 300, the mapping data control unit 230 may generate additional mapping data based on the hot data information HD_INF stored in the hot data information storage unit 210. When the mapping data control unit 230 generates additional mapping data without a request of the host 300, the mapping data control unit 230 may output the additional mapping data to the host 300.

FIGS. 3A and 3B are block diagrams illustrating normal mapping data and additional mapping data in accordance with an embodiment of the present disclosure.

Referring to FIGS. 3A and 3B, mapping data may be generated by the memory controller 200 in response to a request of the host 300. The type of the mapping data may be any one of normal mapping data and additional mapping data. FIG. 3A illustrates an example of the normal mapping data, and FIG. 3B illustrates an example of the additional mapping data.

Referring to FIG. 3A, the normal mapping data may be generated in response to a normal mapping data request of the host 300. The normal mapping data may include mapping information indicating a mapping relationship between a logical block address LBA and a physical block address PBA. The normal mapping data may not include an additional field.

First and second mapping data Mapping_DATA1 and Mapping_DATA2 may be normal mapping data. The mapping data control unit 230 of FIG. 2 may generate the first and second mapping data Mapping_DATA1 and Mapping_DATA2, based on the normal mapping data request received from the host 300. In an embodiment, the number of pieces of normal mapping data generated by the mapping data control unit 230 may be increased.

Each of the first and second mapping data Mapping_DATA1 and Mapping_DATA2 may include mapping information indicating a mapping relationship between a logical block address LBA and a physical block address PBA. In an embodiment, the first mapping data Mapping_DATA1 may include mapping information indicating a mapping relationship between a first logical block address LBA1 and a first physical block address PBA1. The second mapping data Mapping_DATA2 may include mapping information indicating a mapping relationship between a second logical block address LBA2 and a second physical block address PBA2.

Referring to FIG. 3B, the additional mapping data may be generated in response to an additional mapping data request of the host 300. The additional mapping data request may be received from the host 300 based on the hot data information HD_INF received from the hot data information storage unit 210. The additional mapping data request may be a request for generating additional mapping data.

The mapping data control unit 230 may generate additional mapping data including a logical block address LBA in the hot data information HD_INF based on the additional mapping data request. The additional mapping data may include mapping information indicating a mapping relationship between a logical block address LBA and a physical block address PBA, and an additional field. The normal mapping data may include mapping information indicating the mapping relationship between the logical block address LBA and the physical block address PBA. The additional mapping data may be data including the normal mapping data and the additional field information.

The additional mapping data may be output to the host 300. The host 300 may store the additional mapping data in the host memory 310. Thereafter, the host 300 may output an operation request and additional mapping data corresponding to the operation request to the memory controller 200. The memory controller 200 may control an operation to be performed in the memory device 100, based on the operation request and the additional mapping data corresponding to the operation request.

In an embodiment, third and fourth mapping data Mapping_DATA3 and Mapping_DATA4 may be additional mapping data. The mapping data control unit 230 may generate the third and fourth mapping data Mapping_DATA3 and Mapping_DATA4, based on the additional mapping data request received from the host 300. In an embodiment, the number of pieces of additional mapping data generated by the mapping data control unit 230 may be increased.

Each of the third and fourth mapping data Mapping_DATA3 and Mapping_DATA4 may include mapping information indicating the mapping relationship between the logical block address LBA and the physical block address PBA, and an additional field k3, k4. Each of the third and fourth mapping data Mapping_DATA3 and Mapping_DATA4 may include normal mapping data and an additional field.

The third mapping data Mapping_DATA3 may include mapping information indicating a mapping relationship between a third logical block address LBA3 and a third physical block address PBA3, and an additional field k3. The fourth mapping data Mapping_DATA4 may include mapping information indicating a mapping relationship between a fourth logical block address LBA4 and a fourth physical block address PBA4, and an additional field k4. Each of the additional fields k3 and k4 in the third and fourth mapping data Mapping_DATA3 and Mapping_DATA4 may store the number of times the additional mapping data has been updated, or data for error correction.

In an embodiment, in the case where the number of times additional mapping data has been updated is stored in the additional field, the mapping data control unit 230 may determine mapping data to be output to the memory device 100, based on the data stored in the additional field. In an embodiment, in the case where the data for correcting an error in the additional mapping data is included in the additional field, the memory controller 200 may perform an operation of correcting an error that has occurred in the additional mapping data, based on the data stored in the additional field.

Figure 4:
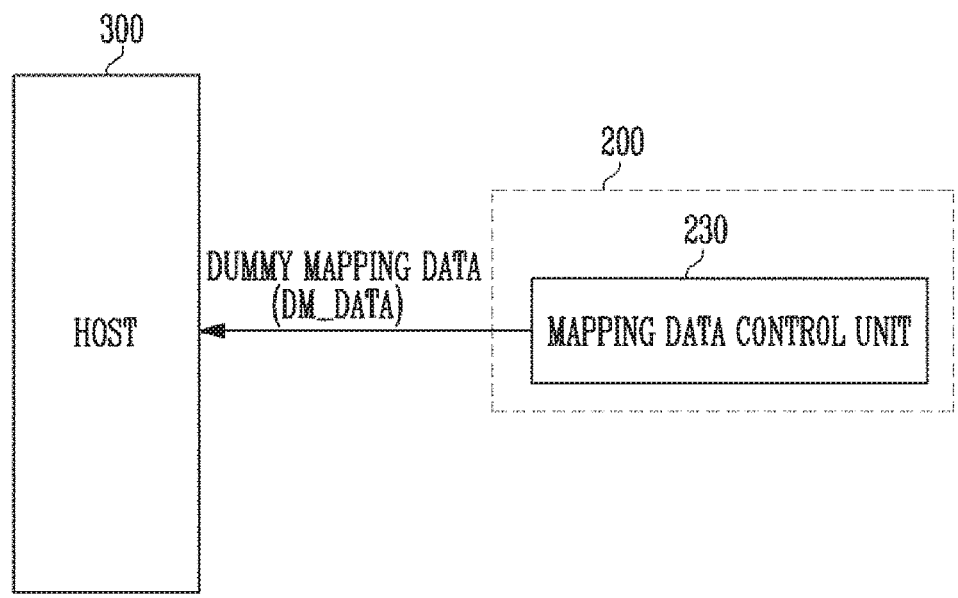
FIG. 4 is a diagram illustrating generation and storage of dummy mapping data in accordance with an embodiment of the present disclosure.

FIG. 4 is a diagram illustrating generation and storage of dummy mapping data in accordance with an embodiment of the present disclosure.

Referring to FIG. 4, the memory controller 200 may include the mapping data control unit 230. In FIG. 4, the hot data information storage unit 210, the request control unit 220, and the delay determination unit 240 that are included in the memory controller 200 are omitted. The memory controller 200 may receive a request and data from the host 300. The request received from the host 300 may be an additional mapping data request. The memory controller 200 may generate a command for instructing to perform the request received from the host 300, and output the command to the memory device (not illustrated). The memory controller 200 may output the data along with the command to the memory device (not illustrated).

The mapping data control unit 230 may generate additional mapping data in response to an additional mapping data request received from the host 300, or without receiving an additional mapping data request from the host 300. The mapping data control unit 230 may generate additional mapping data based on hot data information HD_INF received from the hot data information storage unit 210 without receiving a request from the host 300.

When the memory controller 200 receives a request from the host 300 during generation of the additional mapping data, the mapping data control unit 230 may interrupt the generation of the additional mapping data and generate dummy mapping data DM_DATA which is meaningless. The mapping data control unit 230 may output the dummy mapping data DM_DATA to the host 300. Therefore, the dummy mapping data DM_DATA in lieu of the additional mapping data may be stored in the host memory 310.

In an embodiment, during the generation of the additional mapping data, the mapping data control unit 230 may perform an internal operation pertaining to a logical block address LBA in the additional mapping data. The internal operation pertaining to the logical block address LBA in the additional mapping data may be a garbage collection (GC) operation or a wear-leveling (WL) operation. Examples of the internal operation pertaining to the logical block address LBA in the additional mapping data may include not only the foregoing operations but also various other operations. In this case, the mapping data control unit 230 may generate dummy mapping data DM_DATA. The mapping data control unit 230 may output the dummy mapping data DM_DATA to the host 300.

The dummy mapping data DM_DATA may not include mapping information. In other words, the dummy mapping data DM_DATA may include meaningless mapping data. Hence, the dummy mapping data DM_DATA may include invalid mapping information. The size of the dummy mapping data DM_DATA may be the same as that of the additional mapping data.

In various embodiments, the mapping data control unit 230 may start generation of additional mapping data based on an additional mapping data request received from the host 300 or hot data information HD_INF received from the hot data information storage unit 210. During the generation of the additional mapping data, the memory controller 200 may receive, from the host 300, an operation request and a logical block address corresponding to the operation request.

When the logical block address in the additional mapping data that is being generated by the mapping data control unit 230 matches the logical block address corresponding to the operation request received from the host 300, the mapping data control unit 230 may interrupt the generation of the additional mapping data. The mapping data control unit 230 may interrupt the generation of the additional mapping data and generate dummy mapping data DM_DATA. The mapping data control unit 230 may output the dummy mapping data DM_DATA to the host 300. The host 300 may store, in the host memory 310, the dummy mapping data DM_DATA received from the mapping data control unit 230.

During the generation of the additional mapping data, when the mapping data control unit 230 receives an operation request and a logical block address corresponding to the operation request from the host 300, the additional mapping data that is generated by the mapping data control unit 230 may no longer be valid. When the additional mapping data is invalid, the mapping data control unit 230 may interrupt the generation of the additional mapping data because there is no need to generate the additional mapping data.

The mapping data control unit 230 may interrupt the generation of the additional mapping data and generate dummy mapping data DM_DATA. The mapping data control unit 230 may generate the dummy mapping data DM_DATA in lieu of the additional mapping data.

Figure 5:
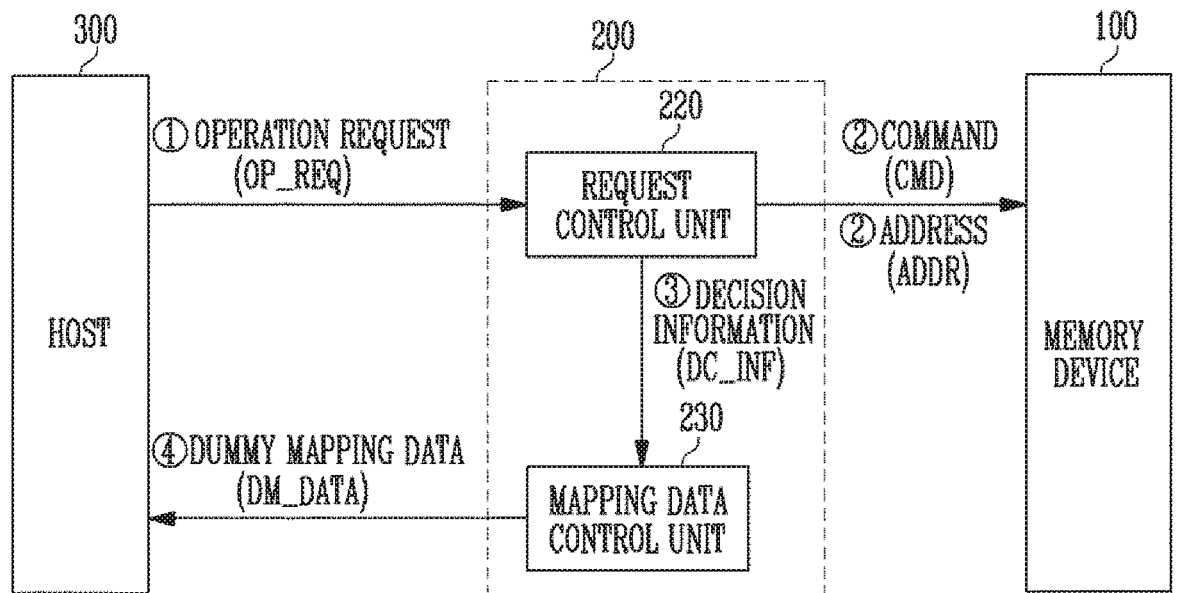
FIG. 5 is a diagram illustrating a process of generating dummy mapping data in accordance with an embodiment of the present disclosure.

FIG. 5 is a diagram illustrating a process of generating dummy mapping data in accordance with an embodiment of the present disclosure.

Referring to FIG. 5, the memory controller 200 may include the request control unit 220 and the mapping data control unit 230. In FIG. 5, the hot data information storage unit 210 and the delay determination unit 240 that are included in the memory controller 200 are omitted.

When the request control unit 220 receives a request from the host 300 during generation of additional mapping data, the mapping data control unit 230 may interrupt the generation of the additional mapping data and generate dummy mapping data DM_DATA, which is meaningless, based on decision information DC_INF received from the request control unit 220. The mapping data control unit 230 may output the dummy mapping data DM_DATA to the host 300. Therefore, the dummy mapping data DM_DATA in lieu of the additional mapping data may be stored in the host memory 310.

The dummy mapping data DM_DATA may not include mapping information. In other words, the dummy mapping data DM_DATA may include meaningless mapping data. Hence, the dummy mapping data DM_DATA may include invalid mapping information. The size of the dummy mapping data DM_DATA may be the same as that of the additional mapping data.

In various embodiments, the mapping data control unit 230 may start generation of additional mapping data based on the additional mapping data request received from the host 300. During the generation of the additional mapping data, the memory controller 200 may receive, from the host 300, an operation request OP_REQ and a logical block address corresponding to the operation request OP_REQ. In an embodiment, the request control unit 220 may receive the logical block address corresponding to the operation request OP_REQ and the operation request OP_REQ. The operation request OP_REQ may be any one of a program request PGM_REQ and an erase request ERA_REQ for controlling the operation of the memory device 100. The request control unit 220 may output a command CMD and an address ADDR based on the operation request OP_REQ received from the host 300.

In an embodiment, the operation request OP_REQ may be a program request PGM_REQ. Therefore, during the generation of the additional mapping data, the request control unit 220 may receive a program request PGM_REQ and a logical block address LBA corresponding to the program request PGM_REQ from the host 300 (①). The request control unit 220 may output a program command PGM_CMD and a program address PGM_ADDR to the memory device 100, based on the program request PGM_REQ received from the host 300 and the logical block address corresponding to the program request PGM_REQ (②). The program address PGM_ADDR may be a physical block address PBA which has a mapping relationship with a logical block address LBA corresponding to the program request PGM_REQ.

The request control unit 220 may generate decision information DC_INF including information about the program request PGM_REQ received from the host 300 and the logical block address LBA corresponding to the program request PGM_REQ. The request control unit 220 may output the generated decision information DC_INF to the mapping data control unit 230 (③). The decision information DC_INF may include information determining whether the request received from the host 300 is a request for generating mapping data or a request for controlling an operation which is performed by the memory device 100. Furthermore, the decision information DC_INF may include information about the logical block address LBA having a mapping relationship with the program address PGM_ADDR.

In an embodiment, the operation request OP_REQ may be an erase request ERA_REQ. Therefore, during the generation of the additional mapping data, the request control unit 220 may receive an erase request ERA_REQ and a logical block address corresponding to the erase request ERA_REQ from the host 300 (①). The request control unit 220 may output an erase command ERA_CMD and an erase address ERA_ADDR to the memory device 100, based on the erase request ERA_REQ received from the host 300 and the logical block address corresponding to the erase request ERA_REQ (②). The erase address ERA_ADDR may be a physical block address having a mapping relationship with the logical block address corresponding to the erase request ERA_REQ. Consequently, the memory device 100 may perform an erase operation based on the erase command ERA_CMD and the erase address ERA_ADDR that are received from the request control unit 220.

In an embodiment, the request control unit 220 may generate decision information DC_INF including information about the erase request ERA_REQ received from the host 300 and the logical block address corresponding to the erase request ERA_REQ. The request control unit 220 may output the generated decision information DC_INF to the mapping data control unit 230 (③). The decision information DC_INF may include information determining whether the request received from the host 300 is a request for generating mapping data or a request for controlling an operation which is performed by the memory device 100. Furthermore, the decision information DC_INF may include information about the logical block address having a mapping relationship with the erase address ERA_ADDR.

The mapping data control unit 230 may receive the decision information DC_INF from the request control unit 220. The mapping data control unit 230 may receive the decision information DC_INF during the generation of the additional mapping data. When the mapping data control unit 230 receives the decision information DC_INF, it may be determined whether a logical block address in the additional mapping data generated by the mapping data control unit 230 matches the logical block address that is received from the host 300 and corresponds to the program request PGM_REQ or the erase request ERA_REQ.

When the logical block address in the additional mapping data that is being generated by the mapping data control unit 230 matches the logical block address corresponding to the program request PGM_REQ or the erase request ERA_REQ, the mapping data control unit 230 may interrupt the generation of the additional mapping data. The mapping data control unit 230 may interrupt the generation of the additional mapping data and generate dummy mapping data DM_DATA. The mapping data control unit 230 may output the dummy mapping data DM_DATA to the host 300 (④). The host 300 may store, in the host memory 310, the dummy mapping data DM_DATA received from the mapping data control unit 230.

In an embodiment, when the logical block address in the additional mapping data that is being generated by the mapping data control unit 230 differs from the logical block address corresponding to the program request PGM_REQ or the erase request ERA_REQ, the mapping data control unit 230 may not interrupt the generation of the additional mapping data. Therefore, after the generation of the additional mapping data has been completed, the mapping data control unit 230 may output the additional mapping data to the host 300. The host 300 may store, in the host memory 310, the additional mapping data received from the mapping data control unit 230.

Consequently, when the mapping data control unit 230 receives a program request PGM_REQ or an erase request ERA_REQ from the host 300 during the generation of the additional mapping data, the additional mapping data that is generated by the mapping data control unit 230 may no longer be valid. When a program operation or an erase operation is performed on the memory device 100 in response to the program request PGM_REQ or the erase request ERA_REQ received from the host 300, the mapping relationship between the logical block address and the physical block address may be removed. Therefore, the additional mapping data that is generated by the mapping data control unit 230 may be invalid. The mapping data control unit 230 may interrupt the generation of the additional mapping data because there is no need to generate invalid additional mapping data.

The mapping data control unit 230 may interrupt the generation of the additional mapping data and generate dummy mapping data DM_DATA. The mapping data control unit 230 may generate the dummy mapping data DM_DATA in lieu of the additional mapping data. Furthermore, since the mapping data control unit 230 transmits the dummy mapping data DM_DATA to the host 300, the host 300 may not transmit, to the memory controller 200, a request which is based on incorrect mapping data.

Figures 6, 7:
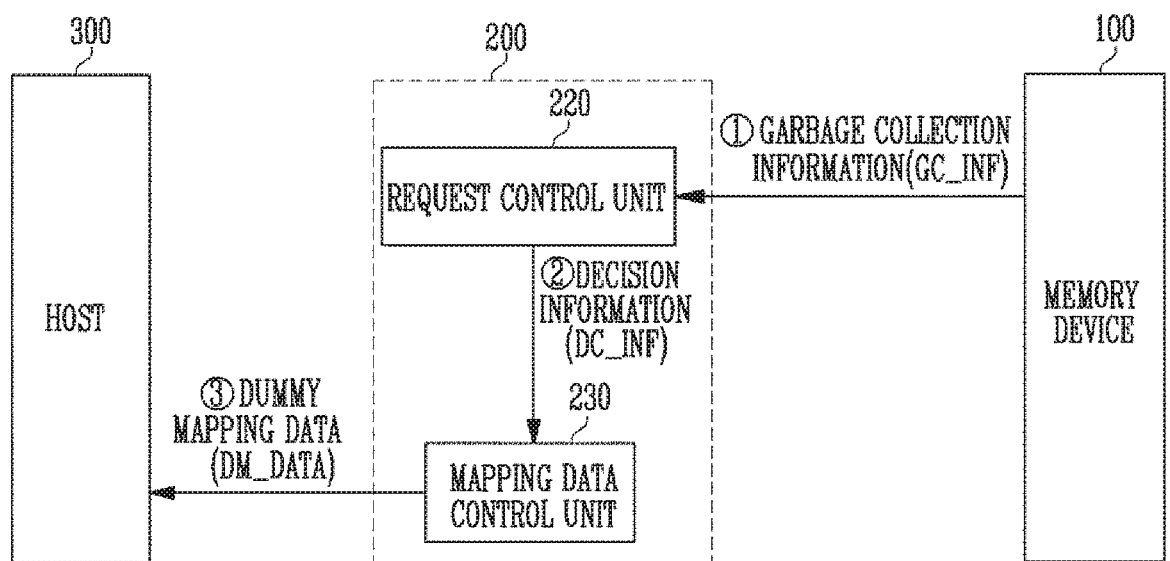
FIG. 6 is a diagram illustrating mapping data generated by a mapping data control unit in accordance with an embodiment of the present disclosure.
FIG. 7 is a diagram illustrating a process of generating dummy mapping data when a memory device performs a garbage collection operation in accordance with an embodiment of the present disclosure.

FIG. 6 is a diagram illustrating mapping data generated by a mapping data control unit (e.g., the mapping data control unit 230 of FIG. 2) in accordance with an embodiment of the present disclosure.

Referring to FIG. 6, mapping data may be generated by the mapping data control unit 230. The type of mapping data may be any one of normal mapping data, additional mapping data, and dummy mapping data. Different types of mapping data may include different types of information.

The normal mapping data may be generated in response to a normal mapping data request of the host 300. The normal mapping data may include mapping information indicating a mapping relationship between a logical block address LBA and a physical block address PBA. The normal mapping data may not include an additional field. The normal mapping data may not output to the host 300.

In an embodiment, first and second mapping data Mapping_DATA1 and Mapping_DATA2 may be normal mapping data. Each of the first and second mapping data Mapping_DATA1 and Mapping_DATA2 may include mapping information indicating a mapping relationship between a logical block address LBA and a physical block address PBA.

The additional mapping data may be generated in response to an additional mapping data request of the host 300. The additional mapping data may include mapping information indicating the mapping relationship between the logical block address LBA and the physical block address PBA, and an additional field. In other words, the additional mapping data may be data including the normal mapping data and the additional field information.

In an embodiment, third and fourth mapping data Mapping_DATA3 and Mapping_DATA4 may be additional mapping data. Each of the third and fourth mapping data Mapping_DATA3 and Mapping_DATA4 may include mapping information indicating the mapping relationship between the logical block address LBA and the physical block address PBA, and an additional field k3, k4, as shown in FIG. 3B. The number of times the additional mapping data has been updated or data for error correction may be stored in the additional field.

The dummy mapping data may be generated when the mapping data control unit 230 receives an operation request from the host 300 during the generation of the additional mapping data. In various embodiments, when a logical block address in the additional mapping data that is being generated matches a logical block address corresponding to the operation request, the dummy mapping data may be generated. The dummy mapping data may include meaningless mapping data.

In an embodiment, the first and second dummy mapping data DM_DATA1 and DM_DATA2 may not include mapping information. The first and second dummy mapping data DM_DATA1 and DM_DATA2 may include invalid mapping information. Furthermore, the size of each of the first and second dummy mapping data DM_DATA1 and DM_DATA2 may be the same as that of the additional mapping data. Therefore, the mapping data control unit 230 may output, to the host 300, dummy mapping data having the same size as that of the additional mapping data. The host 300 may store the dummy mapping data in the host memory 310.

FIG. 7 is a diagram illustrating a process of generating dummy mapping data when a memory device (e.g., the memory device 100 of FIG. 1) performs a garbage collection operation in accordance with an embodiment of the present disclosure.

Referring to FIG. 7, the memory controller 200 may include the request control unit 220 and the mapping data control unit 230. In FIG. 7, the hot data information storage unit 210 and the delay determination unit 240 that are included in the memory controller 200 are omitted.

The garbage collection may be performed by firmware (not illustrated) included in the memory controller 200. The memory controller 200 may perform a garbage collection operation to secure free blocks. The garbage collection operation may be an operation of moving valid page data of one memory block to another memory block and erasing the one memory block.

The memory device 100 may output garbage collection information GC_INF after the garbage collection operation has been completed (①). The garbage collection information GC_INF may include information about the completion of the garbage collection operation and physical block addresses on which the garbage collection operation has been performed. The garbage collection information GC_INF may include mapping information between physical block addresses, i.e., physical-to-physical (P2P) mapping information. The request control unit 220 may receive garbage collection information GC_INF from the memory device 100.

When the garbage collection information GC_INF is received, the request control unit 220 may generate decision information DC_INF about logical block addresses having mapping relationships with respective physical block addresses in the garbage collection information GC_INF. The request control unit 220 may output the decision information DC_INF to the mapping data control unit 230 (②).

The mapping data control unit 230 may receive decision information DC_INF from the request control unit 220 during generation of additional mapping data in response to an additional mapping data request of the host 300. When a logical block address in the additional mapping data that is being generated by the mapping data control unit 230 matches a logical block address in the decision information DC_INF, the mapping data control unit 230 may interrupt the generation of the additional mapping data. The mapping data control unit 230 may interrupt the generation of the additional mapping data and generate dummy mapping data DM_DATA (③). The host 300 may store, in the host memory 310, the dummy mapping data DM_DATA received from the mapping data control unit 230.

The dummy mapping data DM_DATA may not include mapping information. The dummy mapping data DM_DATA may include meaningless mapping data. Hence, the dummy mapping data DM_DATA may include invalid mapping information. The size of the dummy mapping data DM_DATA may be the same as that of the additional mapping data.

In an embodiment, when a logical block address in the additional mapping data that is being generated by the mapping data control unit 230 differs from a logical block address in the decision information DC_INF, the mapping data control unit 230 may generate the additional mapping data. The mapping data control unit 230 may not interrupt the generation of the additional mapping data. After the generation of the additional mapping data has been completed, the mapping data control unit 230 may output the additional mapping data to the host 300. The host 300 may store the additional mapping data in the host memory 310.

Consequently, during the generation of the additional mapping data, when the mapping data control unit 230 receives, from the request control unit 220, the decision information DC_INF generated based on the garbage collection information GC_INF, the additional mapping data that is generated by the mapping data control unit 230 may no longer be valid. In the case where a garbage collection operation is performed on the memory device 100, the mapping relationship between the logical block address and the physical block address may be changed. Therefore, the mapping data control unit 230 may interrupt the generation of the additional mapping data because there is no need to generate the additional mapping data.

The mapping data control unit 230 may interrupt the generation of the additional mapping data and generate dummy mapping data DM_DATA. The mapping data control unit 230 may generate the dummy mapping data DM_DATA in lieu of the additional mapping data. Furthermore, since the mapping data control unit 230 transmits the dummy mapping data DM_DATA to the host 300, the host 300 may not transmit, to the memory controller 200, a request which is based on incorrect mapping data.

Figure 8:
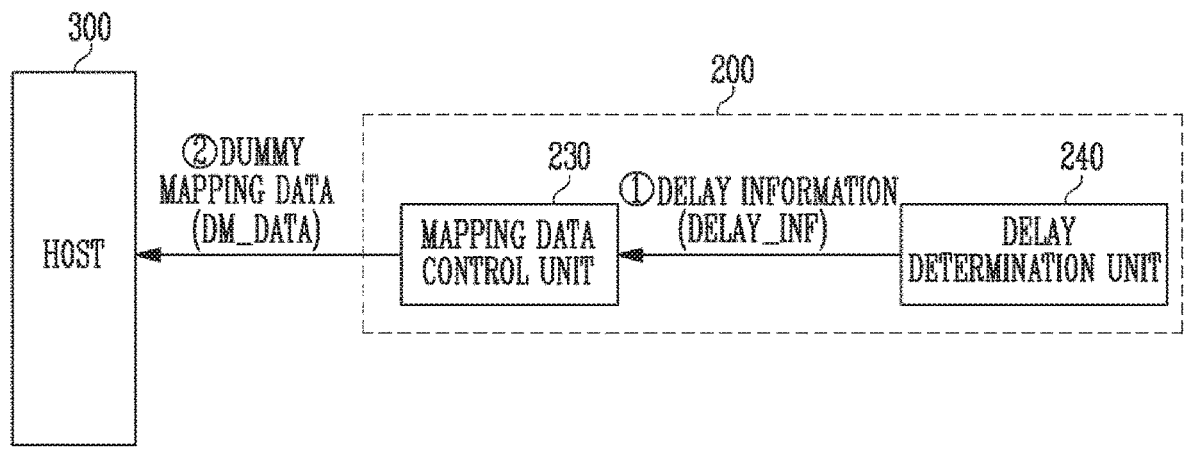
FIG. 8 is a diagram illustrating a process of generating dummy mapping data when a memory controller is in a busy state in accordance with an embodiment of the present disclosure.

FIG. 8 is a diagram illustrating a process of generating dummy mapping data when a memory controller (e.g., the memory controller 200 of FIG. 1) is in a busy state in accordance with an embodiment of the present disclosure.

Referring to FIG. 8, the memory controller 200 may include the mapping data control unit 230 and the delay determination unit 240. In FIG. 8, the hot data information storage unit 210 and the request control unit 220 that are included in the memory controller 200 are omitted.

The delay determination unit 240 may detect a change in state of the memory controller 200. The change in state of the memory controller 200 may be determined based on priorities of operations to be performed by the memory controller 200. In the case where the memory controller 200 cannot generate additional mapping data because the memory controller 200 is performing another operation, the delay determination unit 240 may determine that the state of the memory controller 200 has been changed.

When a change in state of the memory controller 200 is detected, the delay determination unit 240 may output delay information DELAY_INF to the mapping data control unit 230. The delay information DELAY_INF may indicate that the additional mapping data may not be generated or generation of the additional mapping data is delayed to perform an operation having a priority higher than that of the operation of generating the additional mapping data.

The mapping data control unit 230 may receive the delay information DELAY_INF from the delay determination unit 240 during the generation of the additional mapping data. When the mapping data control unit 230 receives the delay information DELAY_INF, the mapping data control unit 230 may interrupt the generation of the additional mapping data. The mapping data control unit 230 may interrupt the generation of the additional mapping data, and may generate dummy mapping data DM_DATA and output the dummy mapping data DM_DATA to the host 300.

The dummy mapping data DM_DATA may be generated by using random data generator included in the mapping data control unit 230. The dummy mapping data DM_DATA may not include mapping information. The dummy mapping data DM_DATA may include meaningless mapping data. Hence, the dummy mapping data DM_DATA may include invalid mapping information. The size of the dummy mapping data DM_DATA may be the same as that of the additional mapping data.

The host 300 may store, in the host memory 310, the dummy mapping data DM_DATA received from the mapping data control unit 230.

Consequently, when the mapping data control unit 230 receives delay information DELAY_INF from the delay determination unit 240 during the generation of the additional mapping data, the mapping data control unit 230 may interrupt the generation of the additional mapping data depending on operational priorities of the memory controller 200. Therefore, the mapping data control unit 230 may not generate the additional mapping data.

The mapping data control unit 230 may generate the dummy mapping data DM_DATA in lieu of the additional mapping data. Furthermore, since the mapping data control unit 230 transmits the dummy mapping data DM_DATA to the host 300, the host 300 may not transmit, to the memory controller 200, a request which is based on incorrect mapping data.

Figure 9:
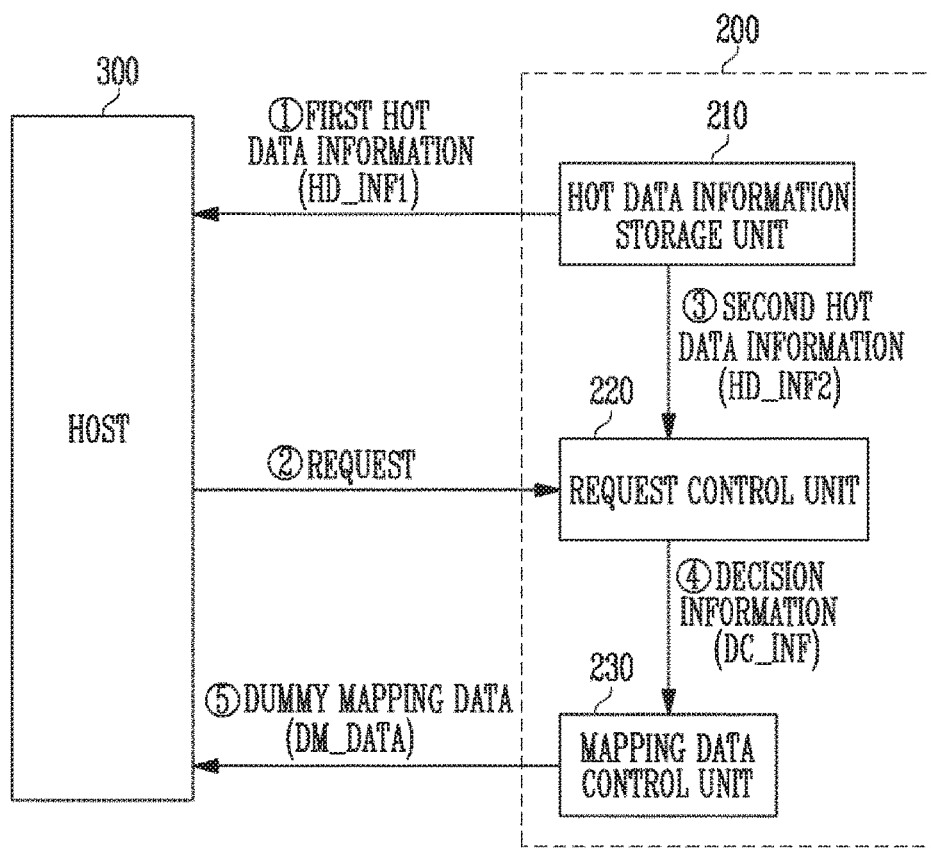
FIG. 9 is a diagram illustrating a process of generating dummy mapping data when hot data information is changed in accordance with an embodiment of the present disclosure.

FIG. 9 is a diagram illustrating a process of generating dummy mapping data when hot data information is changed in accordance with an embodiment of the present disclosure.

Referring to FIG. 9, the memory controller 200 may include the hot data information storage unit 210, the request control unit 220, and the mapping data control unit 230. In FIG. 9, the delay determination unit 240 in the memory controller 200 is omitted.

The hot data information storage unit 210 may store hot data information HD_INF. The hot data information HD_INF may include information about logical block addresses LBA received a predetermined number of times or more from the host 300.

The hot data information storage unit 210 may output stored first hot data information HD_INF to the host 300 (①). First hot data information HD_INF1 may be hot data information to be first output to the host 300.

The host 300 may output a request to the request control unit 220 based on the hot data information HD_INF1 (②). The host 300 may output a request related to the logical block address in the hot data information HD_INF1 to the memory controller 200. The request for generating mapping data including a logical block address in the hot data information HD_INF1 may be an additional mapping data request. Therefore, the request of the host 300 that is output based on the hot data information HD_INF1 may be an additional mapping data request.

When an additional mapping data request is received from the host 300, the request control unit 220 may generate decision information DC_INF for generating the additional mapping data. The decision information DC_INF may include information about the request received from the host 300 and information about a logical block address in the hot data information HD_INF1. When the decision information DC_INF is received from the request control unit 220, the mapping data control unit 230 may generate the additional mapping data including a logical block address in the decision information DC_INF. The mapping data control unit 230 may output the additional mapping data to the host 300. The host 300 may store, in the host memory 310, the additional mapping data received from the mapping data control unit 230.

In an embodiment, the request control unit 220 may output decision information DC_INF based on the first hot data information HD_INF1 stored in the hot data information storage unit 210, without receiving a request from the host 300. The request control unit 220 may perform an operation of internally generating additional mapping data in the memory controller 200 based on the hot data information HD_INF1, regardless of a request of the host 300. In this case, the request control unit 220 may generate decision information DC_INF including a logical block address LBA required to generate additional mapping data.

While the mapping data control unit 230 generates the additional mapping data, the hot data information HD_INF may be updated. The hot data information HD_INF may be updated each time the hot data information HD_INF is changed. Furthermore, the hot data information HD_INF may be periodically updated. Alternatively, the hot data information HD_INF may be updated in response to a request of the host 300. When the hot data information HD_INF is updated, the hot data information storage unit 210 may store the updated hot data information HD_INF. Subsequently, the hot data information storage unit 210 may provide the updated hot data information to the host 300 and/or the request control unit 220.

When the hot data information HD_INF is changed, the first hot data information HD_INF1 may be updated to second hot data information HD_INF2. Therefore, logical block addresses in the second hot data information HD_INF2 may differ from logical block addresses in the first hot data information HD_INF1. The hot data information storage unit 210 may store the second hot data information HD_INF2. The hot data information storage unit 210 may provide the second hot data information HD_INF2 to the host 300 and/or the request control unit 220.

The request control unit 220 may receive the updated second hot data information HD_INF2 from the hot data information storage unit 210 (③). The request control unit 220 may generate decision information DC_INF including information about logical block addresses in the second hot data information HD_INF2. The decision information DC_INF generated by the request control unit 220 may be output to the mapping data control unit 230 (④).

The mapping data control unit 230 may receive the decision information DC_INF from the request control unit 220 during the generation of the additional mapping data. The decision information DC_INF may include information about logical block addresses in the second hot data information HD_INF2. When the mapping data control unit 230 receives the decision information DC_INF, the mapping data control unit 230 may determine whether the logical block address in the additional mapping data that is being generated matches any one of the logical block addresses included in the decision information DC_INF.

When the logical block address in the additional mapping data that is being generated matches any one of the logical block addresses included in the decision information DC_INF, the mapping data control unit 230 may interrupt the generation of the additional mapping data. The mapping data control unit 230 may interrupt the generation of the additional mapping data and generate dummy mapping data DM_DATA. The mapping data control unit 230 may output the dummy mapping data DM_DATA to the host 300 (⑤). The host 300 may store the dummy mapping data DM_DATA in the host memory 310.

In an embodiment, when the logical block address in the additional mapping data that is being generated differs from the logical block addresses in the decision information DC_INF, the mapping data control unit 230 may generate the additional mapping data. The mapping data control unit 230 may not interrupt the generation of the additional mapping data. After the generation of the additional mapping data has been completed, the mapping data control unit 230 may output the additional mapping data to the host 300. The host 300 may store the additional mapping data in the host memory 310.

Consequently, during the generation of the additional mapping data, when the mapping data control unit 230 receives, from the request control unit 220, the decision information DC_INF generated based on the updated hot data information HD_INF, the additional mapping data that is generated by the mapping data control unit 230 may no longer be valid. When the hot data information HD_INF is updated, there is no need to generate the additional mapping data including a logical block address excluded from the hot data information HD_INF. Therefore, the mapping data control unit 230 may interrupt the generation of the additional mapping data because there is no need to generate the additional mapping data.

The mapping data control unit 230 may interrupt the generation of the additional mapping data and generate dummy mapping data DM_DATA. The mapping data control unit 230 may generate the dummy mapping data DM_DATA in lieu of the additional mapping data. Furthermore, since the mapping data control unit 230 transmits the dummy mapping data DM_DATA to the host 300, the host 300 may not transmit, to the memory controller 200, a request which is based on incorrect mapping data.

Figure 10:
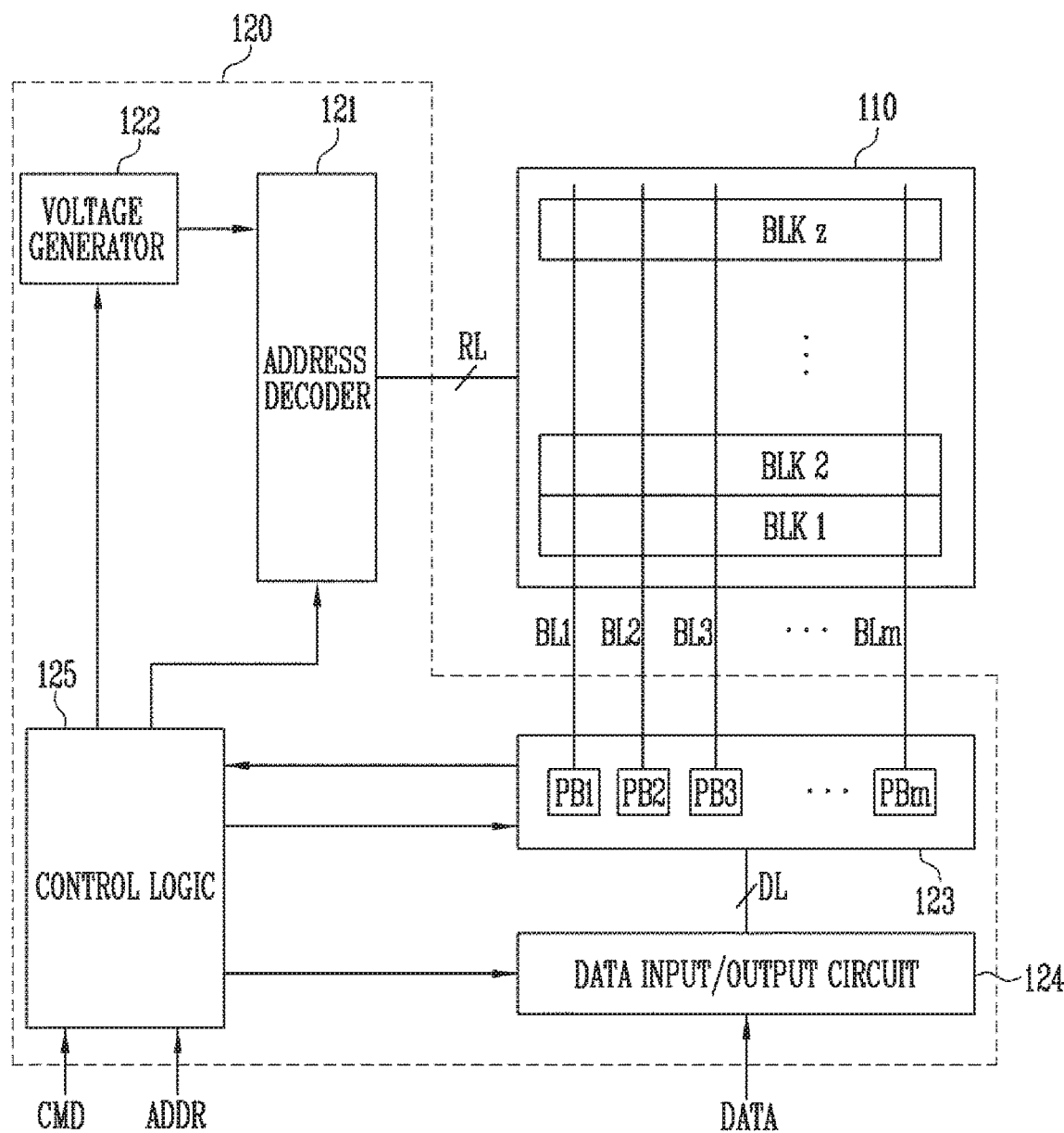
FIG. 10 is a block diagram illustrating a memory device in accordance with an embodiment of the present disclosure.

FIG. 10 is a block diagram illustrating a memory device in accordance with an embodiment of the present disclosure, for example, the memory device 100 of FIG. 1.

Referring to FIG. 10, the memory device 100 may include a memory cell array 110, and a peripheral circuit 120. The peripheral circuit 120 may include an address decoder 121, a voltage generator 122, a read and write (read/write) circuit 123, a data input and output (input/output) circuit 124, and a control logic 125.

The memory cell array 110 may include a plurality of memory blocks BLK1 to BLKz. The memory blocks BLK1 to BLKz are connected to the address decoder 121 through row lines RL and connected to the read/write circuit 123 through bit lines BL1 to BLm. Each of the memory blocks BLK1 to BLKz may include a plurality of memory cells. In an embodiment, the plurality of memory cells may be nonvolatile memory cells.

A plurality of memory cells in the memory cell array 110 may be divided into a plurality of blocks according to the purpose of use. System information such as various setting information required to control the memory device 100 may be stored in the plurality of blocks.

Each of the first to z-th memory blocks BLK1 to BLKz includes a plurality of memory cell strings. First to m-th cell strings are respectively coupled to the first to m-th bit lines BL1 to BLm. Each of the first to m-th cell strings includes a drain select transistor, a plurality of memory cells coupled in series to each other, and a source select transistor. The drain select transistor DST is coupled to a drain select line DSL. First to nth memory cells are respectively coupled to first to nth word lines. The source select transistor SST is coupled to a source select line SSL. A drain of the drain select transistor DST is coupled to the corresponding bit line. The drain select transistors DST of the first to m-th cell strings are respectively coupled to the first to m-th bit lines BL1 to BLm. A source of the source select transistor SST is coupled to a common source line CSL. In an embodiment, the common source line CSL may be coupled in common to the first to z-th memory blocks BLK1 to BLKz. The drain select line DSL, the first to n-th word lines WL1 to WLn, and the source select line SSL are included in the row lines RL. The drain select line DSL, the first to n-th word lines WL1 to WLn, and the source select line SSL are controlled by the address decoder 121. The common source line CSL is controlled by the control logic 125. The first to m-th bit lines BL1 to BLm are controlled by the read/write circuit 123.

The address decoder 121 is coupled to the memory cell array 110 through the row lines RL. The address decoder 121 may operate under control of the control logic 125. The address decoder 121 receives addresses ADDR through the control logic 125.

In an embodiment, a program operation and a read operation of the memory device 100 may be performed on a page basis.

During the program operation or the read operation, addresses ADDR received by the control logic 125 may include a block address and a row address. The address decoder 121 may decode a block address among the received addresses ADDR. The address decoder 121 may select a corresponding one of the memory blocks BLK1 to BLKz in response to the decoded block address.

The address decoder 121 may decode a row address among the received addresses ADDR. In response to the decoded row address, the address decoder 121 may apply voltages, provided from the voltage generator 122, to the row lines RL and select one word line of the selected memory block.

During an erase operation, the addresses ADDR may include a block address. The address decoder 121 may decode the block address and select one memory block according to the decoded block address. The erase operation may be performed on the entirety or a portion of one memory block.

During a partial erase operation, the addresses ADDR may include block and row addresses. The address decoder 121 may select a corresponding one of the memory blocks BLK1 to BLKz in response to the decoded block address.

The address decoder 121 may decode row addresses among the received addresses ADDR. In response to the decoded row addresses, the address decoder 121 may apply voltages, provided from the voltage generator 122, to the row lines RL and select at least one word line of the selected memory block.

In an embodiment, the address decoder 121 may include a block decoder, a word line decoder, and an address buffer.

The voltage generator 122 may generate a plurality of voltages using an external supply voltage supplied to the memory device 100. The voltage generator 122 may operate under control of the control logic 125.

In an embodiment, the voltage generator 122 may generate an internal supply voltage by regulating the external supply voltage. The internal supply voltage generated from the voltage generator 122 may be used as an operating voltage of the memory device 100.

In an embodiment, the voltage generator 122 may generate a plurality of voltages using the external supply voltage or the internal supply voltage. For example, the voltage generator 122 may include a plurality of pumping capacitors for receiving the internal supply voltage, and generate a plurality of voltages by selectively activating the plurality of pumping capacitors under control of the control logic 125. The generated voltages are applied to selected word lines by the address decoder 121.

During a program operation, the voltage generator 122 may generate a program pulse having a high voltage and a pass pulse lower in voltage level than the program pulse. During a read operation, the voltage generator 122 may generate a read voltage and a pass voltage higher than the read voltage. During an erase operation, the voltage generator 122 may generate an erase voltage.

The read/write circuit 123 may include first to m-th page buffers PB1 to PBm. The first to m-th page buffers PB1 to PBm are coupled to the memory cell array 110 through the first to m-th bit lines BL1 to BLm, respectively. The first to m-th page buffers PB1 to PBm may operate under control of the control logic 125.

The first to m-th page buffers PB1 to PBm may perform data communication with the data input/output circuit 124.

During a program operation, the first to m-th page buffers PB1 to PBm may receive data DATA to be stored through the data input/output circuit 124 and data lines DL.

During the program operation, the first to m-th page buffers PB1 to PBm may transmit the data, received through the data input/output circuit 124, to selected memory cells through the bit lines BL1 to BLm when a program pulse is applied to a selected word line. The memory cells in the selected page are programmed based on the transmitted data. A memory cell coupled to a bit line to which a program enable voltage (e.g. a ground voltage) is applied may have an increased threshold voltage. The threshold voltage of a memory cell coupled to a bit line to which a program inhibit voltage (for example, a supply voltage) is applied may be retained. During a program verify operation, the first to m-th page buffers PB1 to PBm may read page data from selected memory cells through the bit lines BL1 to BLm.

During a read operation, the read/write circuit 123 may read data DATA from the memory cells in the selected page through the bit lines BL, and output the read data DATA to the data input/output circuit 124. During an erase operation, the read/write circuit 123 may float the bit lines BL.

In an embodiment, the read/write circuit 123 may include a column select circuit.

The data input/output circuit 124 is coupled to the first to m-th page buffers PB1 to PBm through the data lines DL. The data input/output circuit 124 may operate under control of the control logic 125. During a program operation, the data input/output circuit 124 may receive data to be stored from an external controller (not shown).

The control logic 125 is connected to the address decoder 121, the voltage generator 122, the read/write circuit 123, and the data input/output circuit 124. The control logic 125 may control overall operations of the memory device 100. The control logic 125 may receive a command CMD and addresses ADDR from the external controller. The control logic 125 may control the address decoder 121, the voltage generator 122, the read/write circuit 123, and the data input/output circuit 124 in response to the command CMD.

Figure 11:
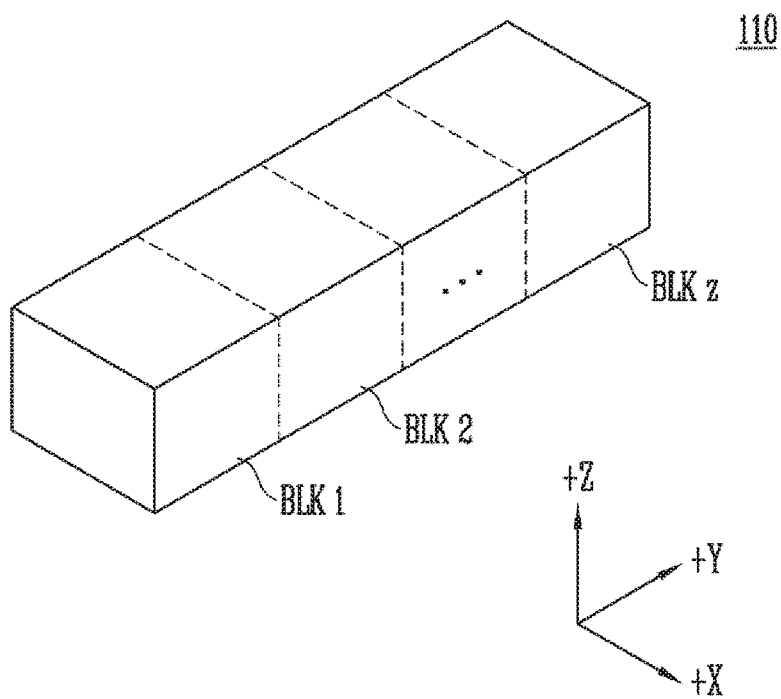
FIG. 11 is a diagram illustrating a memory cell array in accordance with an embodiment of the present disclosure.

FIG. 11 is a diagram illustrating an example of a memory cell array in accordance with an embodiment of the present disclosure, for example, the memory cell array 110 of FIG. 10.

Referring to FIG. 11, the memory cell array 110 may include a plurality of memory blocks BLK1 to BLKz. Each memory block may have a three-dimensional structure. Each memory block may include a plurality of memory cells stacked on a substrate. The memory cells are arranged in a +X direction, a +Y direction, and a +Z direction. The structure of each memory block will be described in more detail with reference to FIGS. 12 and 13.

Figure 12:
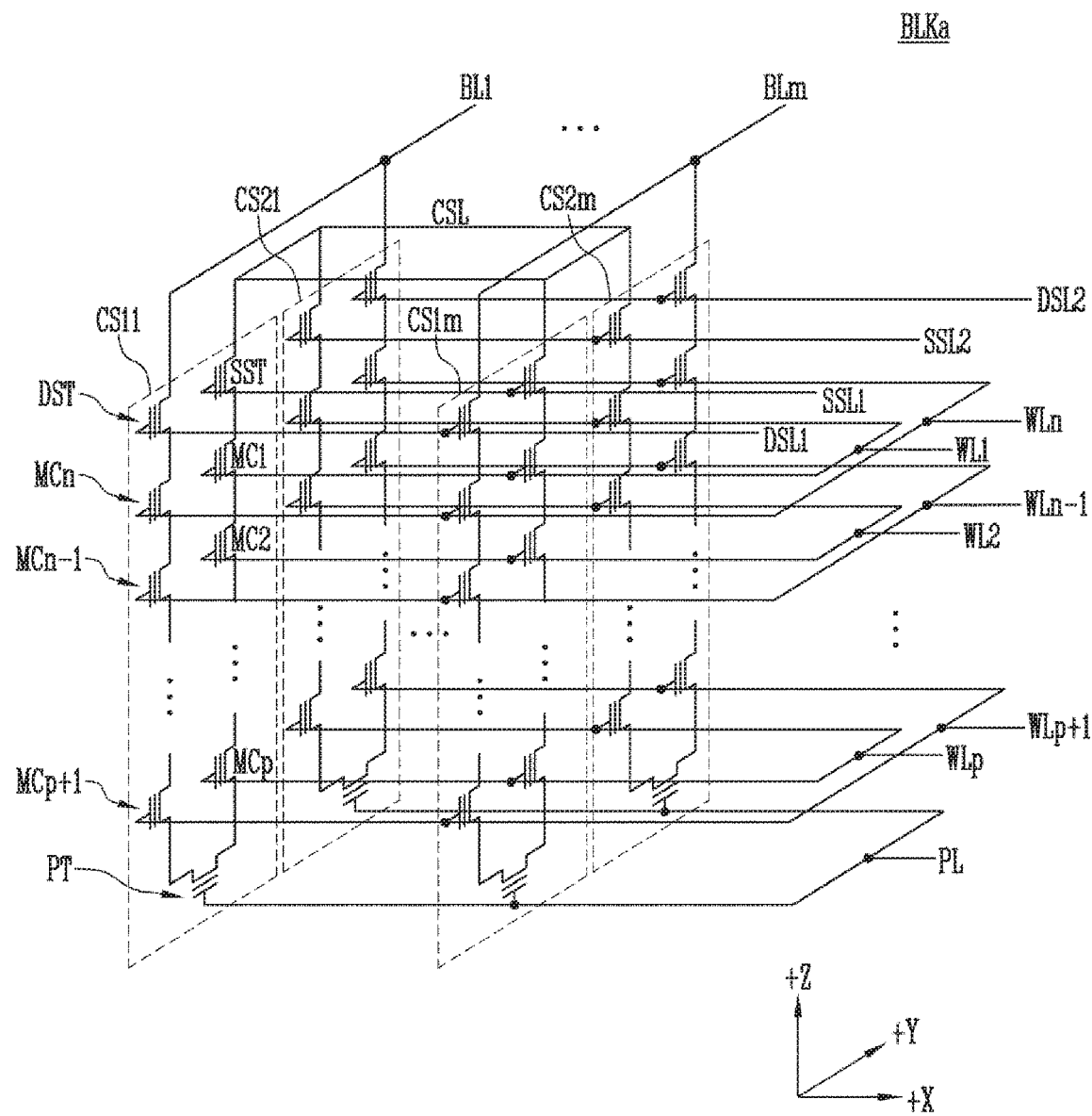
FIG. 12 is a circuit diagram illustrating a memory block in accordance with an embodiment of the present disclosure.

FIG. 12 is a circuit diagram illustrating a memory block in accordance with an embodiment of the present disclosure, for example, a memory block BLKa of a plurality of memory blocks BLK1 to BLKz of FIG. 11.

Referring to FIG. 12, the memory block BLKa may include a plurality of cell strings CS11 to CS1m and CS21 to CS2m. In an embodiment, each of the cell strings CS11 to CS1m and CS21 to CS2m may be formed in a shape. In the memory block BLKa, m cell strings may be arranged in a row direction (i.e., the +X direction). In FIG. 11, two cell strings are illustrated as being arranged in a column direction (i.e., the +Y direction). However, this illustration is made only for convenience, and it will be understood that three or more cell strings may be arranged in the column direction.

Each of the plurality of cell strings CS11 to CS1m and CS21 to CS2m may include at least one source select transistor SST, first to n-th memory cells MC1 to MCn, a pipe transistor PT, and at least one drain select transistor DST.

The select transistors SST and DST and the memory cells MC1 to MCn may have similar structures, respectively. In an embodiment, each of the select transistors SST and DST and the memory cells MC1 to MCn may include a channel layer, a tunneling insulating layer, a charge storage layer, and a blocking insulating layer. In an embodiment, a pillar for providing the channel layer may be provided in each cell string. In an embodiment, a pillar for providing at least one of the channel layer, the tunneling insulating layer, the charge storage layer, and the blocking insulating layer may be provided in each cell string.

The source select transistor SST of each cell string is coupled between the common source line CSL and the memory cells MC1 to MCp.

In an embodiment, source select transistors of cell strings arranged in the same row are coupled to a source select line extending in a row direction, and source select transistors of cell strings arranged in different rows are coupled to different source select lines. In FIG. 12, source select transistors of the cell strings CS11 to CS1m in a first row are coupled to a first source select line SSL1. Source select transistors of the cell strings CS21 to CS2m in a second row are coupled to a second source select line SSL2.

In an embodiment, the source select transistors of the cell strings CS11 to CS1m and CS21 to CS2m may be coupled in common to a single source select line.

The first to n-th memory cells MC1 to MCn in each cell string are coupled between the source select transistor SST and the drain select transistor DST.

The first to n-th memory cells MC1 to MCn may be divided into first to p-th memory cells MC1 to MCp and (p+1)-th to n-th memory cells MCp+1 to MCn. The first to p-th memory cells MC1 to MCp are successively arranged in a direction opposite to the +Z direction and are coupled in series between the source select transistor SST and the pipe transistor PT. The (p+1)-th to nth memory cells MCp+1 to MCn are successively arranged in the +Z direction and are coupled in series between the pipe transistor PT and the drain select transistor DST. The first to p-th memory cells MC1 to MCp and the (p+1)-th to n-th memory cells MCp+1 to MCn are coupled to each other through the pipe transistor PT. The gates of the first to n-th memory cells MC1 to MCn of each cell string are coupled to first to n-th word lines WL1 to WLn, respectively.

Respective gates of the pipe transistors PT of the cell strings are coupled to a pipeline PL.

The drain select transistor DST of each cell string is coupled between the corresponding bit line and the memory cells MCp+1 to MCn. The cell strings arranged in the row direction are coupled to drain select lines extending in the row direction. Drain select transistors of the cell strings CS11 to CS1m in the first row are coupled to a first drain select line DSL1. Drain select transistors of the cell strings CS21 to CS2m in the second row are coupled to a second drain select line DSL2.

Cell strings arranged in the column direction may be coupled to bit lines extending in the column direction. In FIG. 12, cell strings CS11 and CS21 in a first column are coupled to a first bit line BL1. Cell strings CS1m and CS2m in an m-th column are coupled to an m-th bit line BLm.

Memory cells coupled to the same word line in cell strings arranged in the row direction form a single page. For example, memory cells coupled to the first word line WL1, among the cell strings CS11 to CS1m in the first row, form a single page. Memory cells coupled to the first word line WL1, among the cell strings CS21 to CS2m in the second row, form another single page. When any one of the drain select lines DSL1 and DSL2 is selected, corresponding cell strings arranged in the direction of a single row may be selected. When any one of the word lines WL1 to WLn is selected, a corresponding single page may be selected from among the selected cell strings.

In an embodiment, even bit lines and odd bit lines may be provided in lieu of the first to m-th bit lines BL1 to BLm. Even-number-th cell strings of the cell strings CS11 to CS1m or CS21 to CS2m arranged in the row direction may be coupled to respective even bit lines. Odd-number-th cell strings of the cell strings CS11 to CS1m or CS21 to CS2m arranged in the row direction may be coupled to respective odd bit lines.

In an embodiment, at least one of the first to n-th memory cells MC1 to MCn may be used as a dummy memory cell. For example, at least one or more dummy memory cells may be provided to reduce an electric field between the source select transistor SST and the memory cells MC1 to MCp. Alternatively, at least one or more dummy memory cells may be provided to reduce an electric field between the drain select transistor DST and the memory cells MCp+1 to MCn. As the number of dummy memory cells is increased, the reliability in operation of the memory block BLKa may be increased, while the size of the memory block BLKa may be increased. As the number of dummy memory cells is reduced, the size of the memory block BLKa may be reduced, but the reliability in operation of the memory block BLKa may be reduced.

To efficiently control the at least one dummy memory cells, each of the dummy memory cells may have a required threshold voltage. Before or after an erase operation on the memory block BLKa is performed, program operations may be performed on all or some of the dummy memory cells. In the case where an erase operation is performed after a program operation has been performed, the dummy memory cells may have required threshold voltages by controlling voltages to be applied to the dummy word lines coupled to the respective dummy memory cells.

Figure 13:
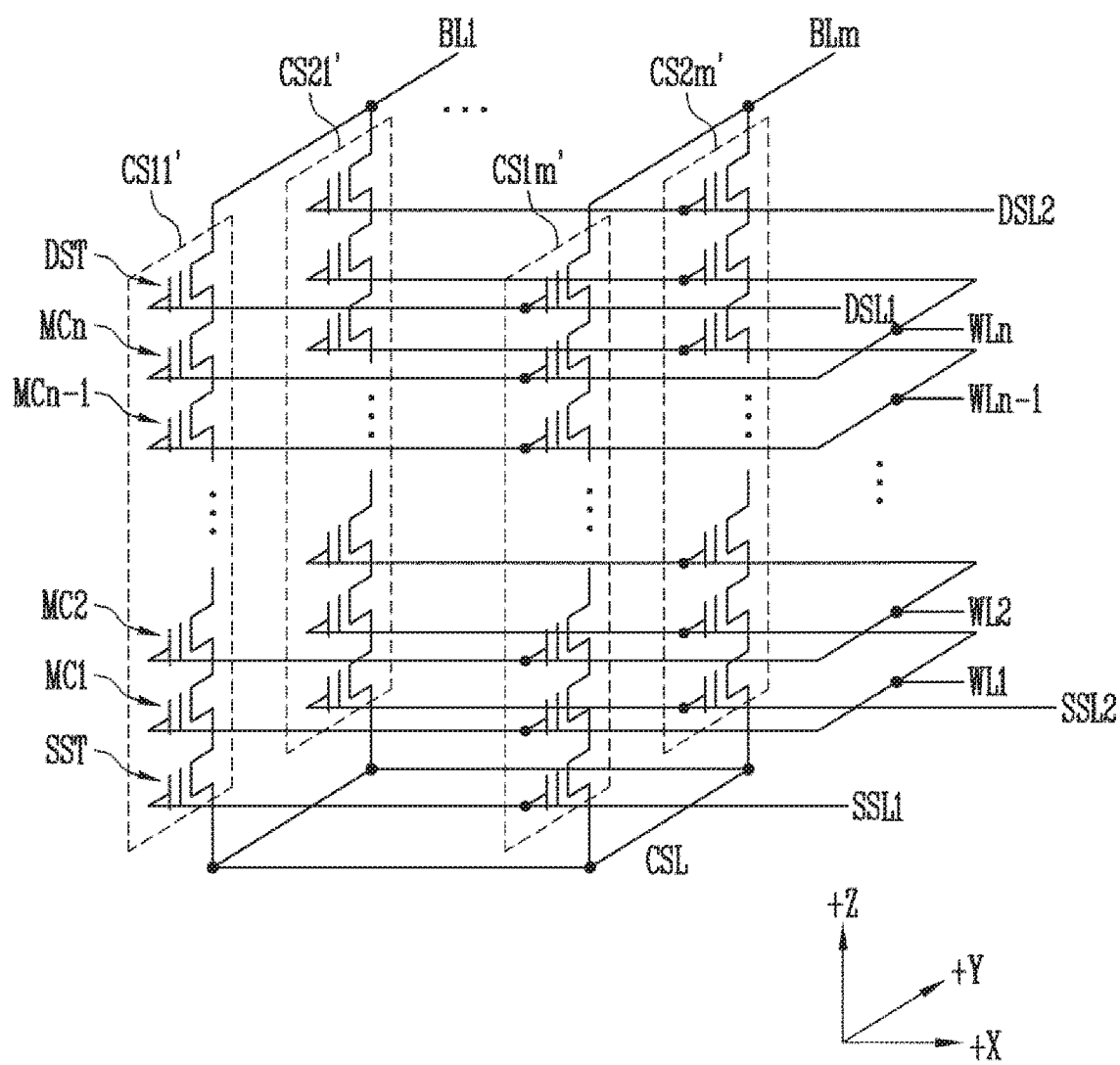
FIG. 13 is a circuit diagram illustrating a memory block in accordance with an embodiment of the present disclosure.

FIG. 13 is a circuit diagram illustrating a memory block in accordance with an embodiment of the present disclosure, for example, a memory block BLKb of a plurality of memory blocks BLK1 to BLKz of FIG. 11.

Referring to FIG. 13, the memory block BLKb may include a plurality of cell strings CS11' to CS1m' and CS21' to CS2m'. Each of the cell strings CS11' to CS1m' and CS21' to CS2m' extends in the +Z direction. Each of the cell strings CS11' to CS1m' and CS21' to CS2m' may include at least one source select transistor SST, first to n-th memory cells MC1 to MCn, and at least one drain select transistor DST which are stacked on a substrate (not shown) provided in a lower portion of the memory block BLK1'.

The source select transistor SST of each cell string is coupled between the common source line CSL and the memory cells MC1 to MCn. The source select transistors of cell strings arranged in the same row are coupled to the same source select line. Source select transistors of the cell strings CS11' to CS1m' arranged in a first row may be coupled to a first source select line SSL1. Source select transistors of the cell strings CS21' to CS2m' arranged in a second row may be coupled to a second source select line SSL2. In an embodiment, source select transistors of the cell strings CS11' to CS1m' and CS21' to CS2m' may be coupled in common to a single source select line.

The first to n-th memory cells MC1 to MCn in each cell string are coupled in series between the source select transistor SST and the drain select transistor DST. Gates of the first to n-th memory cells MC1 to MCn are respectively coupled to first to n-th word lines WL1 to WLn.

The drain select transistor DST of each cell string is coupled between the corresponding bit line and the memory cells MC1 to MCn. Drain select transistors of cell strings arranged in the row direction may be coupled to drain select lines extending in the row direction. Drain select transistors of the cell strings CS11' to CS1m' in the first row are coupled to a first drain select line DSL1. Drain select transistors of the cell strings CS21' to CS2m' in the second row may be coupled to a second drain select line DSL2.

Consequentially, the memory block BLKb of FIG. 13 may have an equivalent circuit similar to that of the memory block BLKa of FIG. 12 except that a pipe transistor PT is excluded from each cell string.

In an embodiment, even bit lines and odd bit lines may be provided in lieu of the first to m-th bit lines BL1 to BLm. Even-number-th cell strings among the cell strings CS11' to CS1m' or CS21' to CS2m' arranged in the row direction may be coupled to the respective even bit lines, and odd-number-th cell strings among the cell strings CS11' to CS1m' or CS21' to CS2m' arranged in the row direction may be coupled to the respective odd bit lines.

In an embodiment, at least one of the first to n-th memory cells MC1 to MCn may be used as a dummy memory cell. For example, at least one or more dummy memory cells may be provided to reduce an electric field between the source select transistor SST and the memory cells MC1 to MCn. Alternatively, at least one or more dummy memory cells may be provided to reduce an electric field between the drain select transistor DST and the memory cells MC1 to MCn. As the number of dummy memory cells is increased, the reliability in operation of the memory block BLKb may be increased, while the size of the memory block BLKb may be increased. As the number of dummy memory cells is reduced, the size of the memory block BLKb may be reduced, but the reliability in operation of the memory block BLKb may be reduced.

To efficiently control the at least one dummy memory cells, each of the dummy memory cells may have a required threshold voltage. Before or after an erase operation on the memory block BLKb is performed, program operations may be performed on all or some of the dummy memory cells. In the case where an erase operation is performed after a program operation has been performed, the dummy memory cells may have required threshold voltages by controlling voltages to be applied to the dummy word lines coupled to the respective dummy memory cells.

Figure 14:
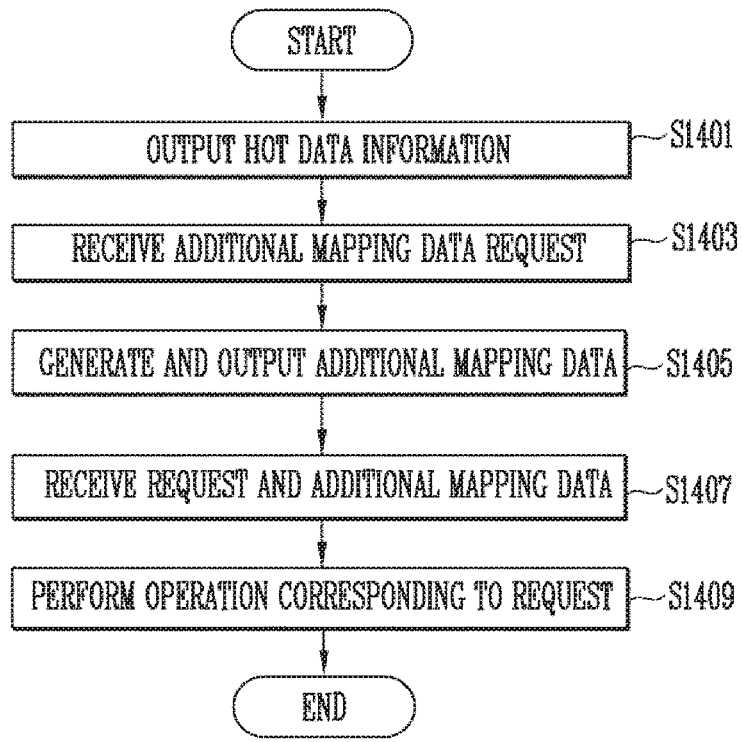
FIG. 14 is a diagram illustrating an operation of a memory controller in accordance with an embodiment of the present disclosure.

FIG. 14 is a diagram illustrating an operation of a memory controller (e.g., the memory controller 200 of FIG. 2) in accordance with an embodiment of the present disclosure.

Referring to FIG. 14, at step S1401, the hot data information storage unit 210 may output hot data information HD_INF to the host 300. The hot data information HD_INF may include information about frequencies of access of the host 300 and the memory controller 200. In an embodiment, the hot data information HD_INF may include information about logical block addresses LBA received a predetermined number of times or more from the host 300.

At step S1403, the request control unit 220 may receive an additional mapping data request from the host 300. The additional mapping data request may be a request for generating additional mapping data. The additional mapping data may include mapping information indicating a mapping relationship between a logical block address LBA and a physical block address PBA, and an additional field.

In various embodiments, the host 300 may request generation of mapping data including a logical block address LBA in the hot data information HD_INF. The request output from the host 300 based on the logical block address in the hot data information may be an additional mapping data request.

In an embodiment, step S1403 may be omitted. The request control unit 220 may generate decision information DC_INF for generating the additional mapping data without receiving an additional mapping data request from the host 300.

At step S1405, the mapping data control unit 230 may generate and output the additional mapping data. In various embodiments, when the request control unit 220 receives the additional mapping data request from the host 300, the request control unit 220 may generate the decision information DC_INF for generating the additional mapping data. The decision information DC_INF may include information about the type of request received from the host 300 and a logical block address LBA corresponding to the request received from the host 300.

In an embodiment, the request control unit 220 may generate decision information DC_INF based on the hot data information HD_INF stored in the hot data information storage unit 210, without receiving a request from the host 300. The request control unit 220 may perform an operation of internally generating additional mapping data in the memory controller 200 based on the hot data information HD_INF, regardless of a request of the host 300.

The mapping data control unit 230 may generate additional mapping data based on the decision information DC_INF received from the request control unit 220. The mapping data control unit 230 may generate the additional mapping data including a logical block address in the decision information DC_INF. The additional mapping data may be output to the host 300. The host 300 may store the additional mapping data in the host memory 310.

At step S1407, the memory controller 200 may receive a request and additional mapping data from the host 300. When transmitting the request to the memory controller 200, the host 300 may also transmit additional mapping data corresponding to the request to the memory controller 200. The additional mapping data may be data stored in the host memory 310. The request received from the host 300 may be any one of a program request, a read request, and an erase request.

At step S1409, the memory controller 200 may perform an operation corresponding to the request received from the host 300. In the case where the additional mapping data along with the request is received from the host 300, there is no need to translate a logical block address to a physical block address, so that the memory controller 200 may perform an operation corresponding to the request using the additional mapping data received from the host 300.

Figure 15:
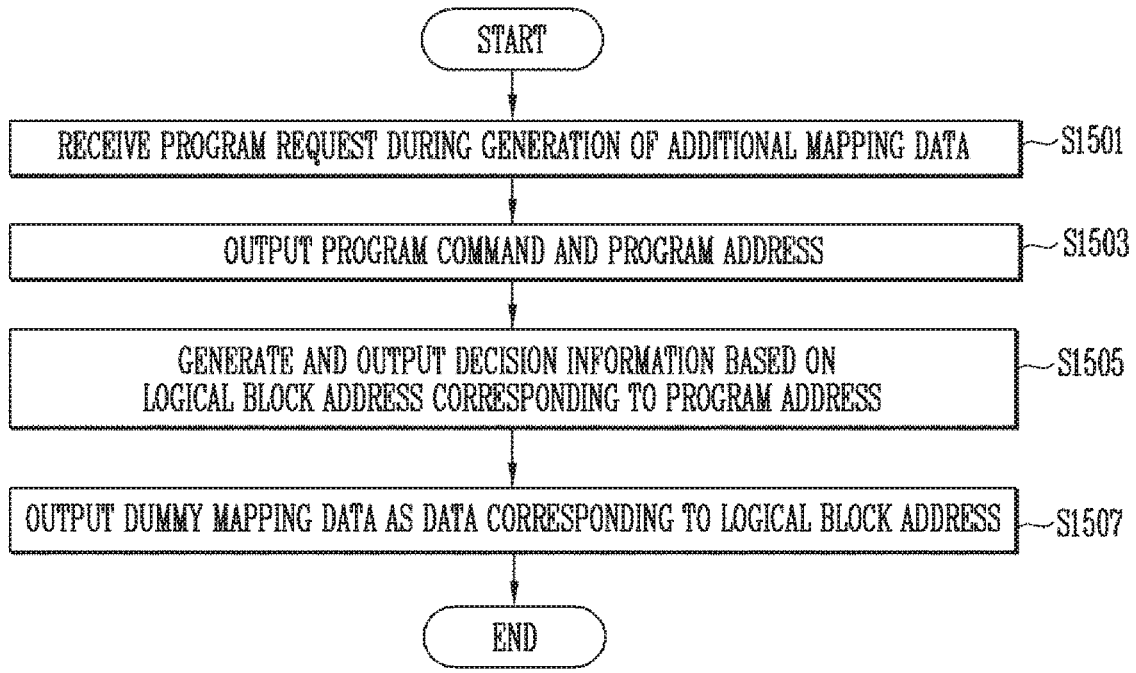
FIG. 15 is a diagram illustrating an operation of a memory controller in accordance with an embodiment of the present disclosure.

FIG. 15 is a diagram illustrating an operation of a memory controller (e.g., the memory controller 200 of FIGS. 2 and 5) in accordance with an embodiment of the present disclosure.

Referring to FIG. 15, at step S1501, the memory controller 200 may receive a program request PGM_REQ from the host 300 during generation of additional mapping data. The program request PGM_REQ may be a request for performing a program operation by the memory device 100.

In various embodiments, after the mapping data control unit 230 starts generation of the additional mapping data based on the additional mapping data request received from the host 300, the mapping data control unit 230 may receive the program request PGM_REQ and a logical block address LBA corresponding to the program request PGM_REQ from the host 300.

At step S1503, the request control unit 220 may output a program command PGM_CMD and a program address PGM_ADDR to the memory device 100, based on the program request PGM_REQ received from the host 300 and the logical block address corresponding to the program request PGM_REQ. The program address PGM_ADDR may be a physical block address PBA which has a mapping relationship with a logical block address LBA corresponding to the program request PGM_REQ.

At step S1505, the request control unit 220 may generate and output decision information DC_INF based on the logical block address corresponding to the program address PGM_ADDR. In various embodiments, the request control unit 220 may generate decision information DC_INF including information about the program request PGM_REQ received from the host 300 and the logical block address LBA corresponding to the program request PGM_REQ.

The decision information DC_INF may include information determining whether the request received from the host 300 is a request for generating mapping data or a request for controlling an operation which is performed by the memory device 100. Furthermore, the decision information DC_INF may include information about the logical block address LBA having a mapping relationship with the program address PGM_ADDR.

At step S1507, the mapping data control unit 230 may output dummy mapping data as data corresponding to the logical block address. In various embodiments, the mapping data control unit 230 may receive the decision information DC_INF during the generation of the additional mapping data. When the mapping data control unit 230 receives the decision information DC_INF, it may be determined whether the logical block address in the additional mapping data, which is generated by the mapping data control unit 230, matches the logical block address that is received from the host 300 and corresponds to the program request PGM_REQ.

When the logical block address in the additional mapping data that is being generated by the mapping data control unit 230 matches the logical block address corresponding to the program request PGM_REQ, the mapping data control unit 230 may interrupt the generation of the additional mapping data. The mapping data control unit 230 may interrupt the generation of the additional mapping data and generate dummy mapping data DM_DATA. The mapping data control unit 230 may output the dummy mapping data DM_DATA to the host 300 as data corresponding to the matched logical block address.

Figure 16:
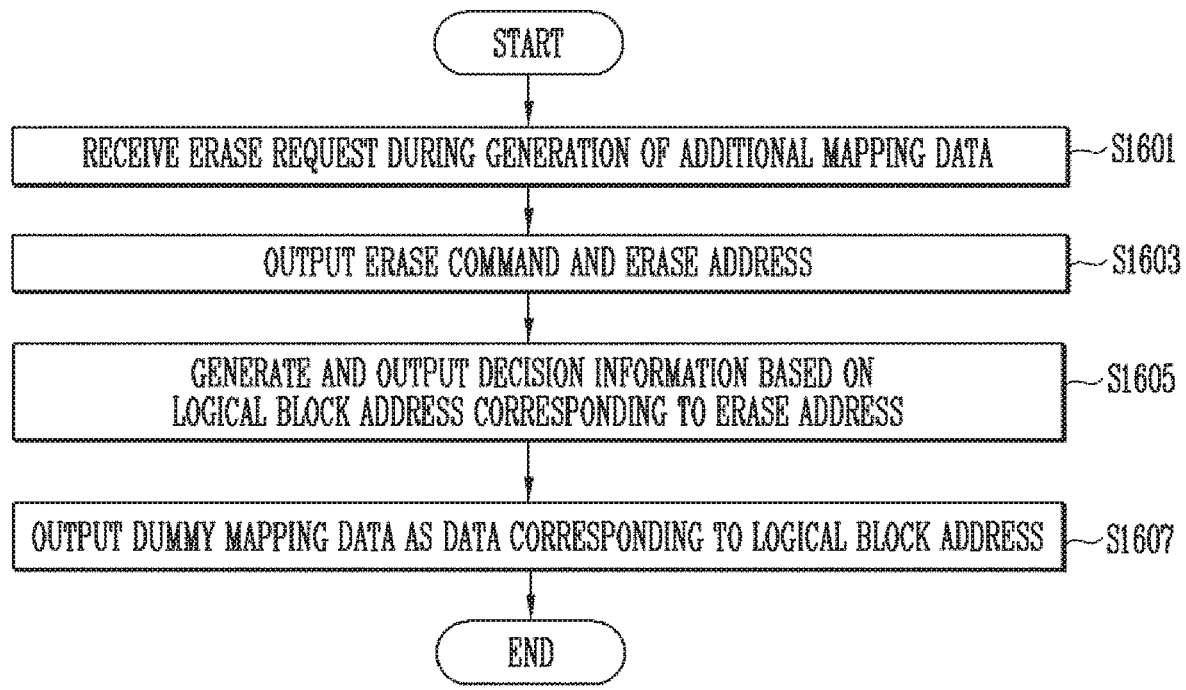
FIG. 16 is a diagram illustrating an operation of a memory controller in accordance with an embodiment of the present disclosure.

FIG. 16 is a diagram illustrating an operation of a memory controller (e.g., the memory controller 200 of FIGS. 2 and 5) in accordance with an embodiment of the present disclosure.

Referring to FIG. 16, at step S1601, the memory controller 200 may receive an erase request ERA_REQ from the host 300 during generation of additional mapping data. The erase request ERA_REQ may be a request for performing an erase operation by the memory device 100.

In various embodiments, after the mapping data control unit 230 starts generation of the additional mapping data based on the additional mapping data request received from the host 300, the mapping data control unit 230 may receive the erase request ERA_REQ and a logical block address LBA corresponding to the erase request ERA_REQ from the host 300.

At step S1603, the request control unit 220 may output an erase command ERA_CMD and an erase address ERA_ADDR to the memory device 100, based on the erase request ERA_REQ received from the host 300 and the logical block address corresponding to the erase request ERA_REQ. The erase address ERA_ADDR may be a physical block address having a mapping relationship with the logical block address corresponding to the erase request ERA_REQ. Consequently, the memory device 100 may perform an erase operation based on the erase command ERA_CMD and the erase address ERA_ADDR that are received from the request control unit 220.

At step S1605, the request control unit 220 may generate and output decision information DC_INF including information about the erase request ERA_REQ received from the host 300 and the logical block address corresponding to the erase request ERA_REQ.

The decision information DC_INF may include information determining whether the request received from the host 300 is a request for generating mapping data or a request for controlling an operation which is performed by the memory device 100. Furthermore, the decision information DC_INF may include information about the logical block address having a mapping relationship with the erase address ERA_ADDR.

At step S1607, the mapping data control unit 230 may output dummy mapping data as data corresponding to the logical block address. In various embodiments, the mapping data control unit 230 may receive the decision information DC_INF during the generation of the additional mapping data. When the mapping data control unit 230 receives the decision information DC_INF, it may be determined whether the logical block address in the additional mapping data generated by the mapping data control unit 230 matches the logical block address that is received from the host 300 and corresponds to the program request PGM_REQ.

When the logical block address in the additional mapping data that is being generated by the mapping data control unit 230 matches the logical block address corresponding to the erase request ERA_REQ, the mapping data control unit 230 may interrupt the generation of the additional mapping data. The mapping data control unit 230 may interrupt the generation of the additional mapping data and generate dummy mapping data DM_DATA. The mapping data control unit 230 may output the dummy mapping data DM_DATA to the host 300 as data corresponding to the matched logical block address.

Figure 17:
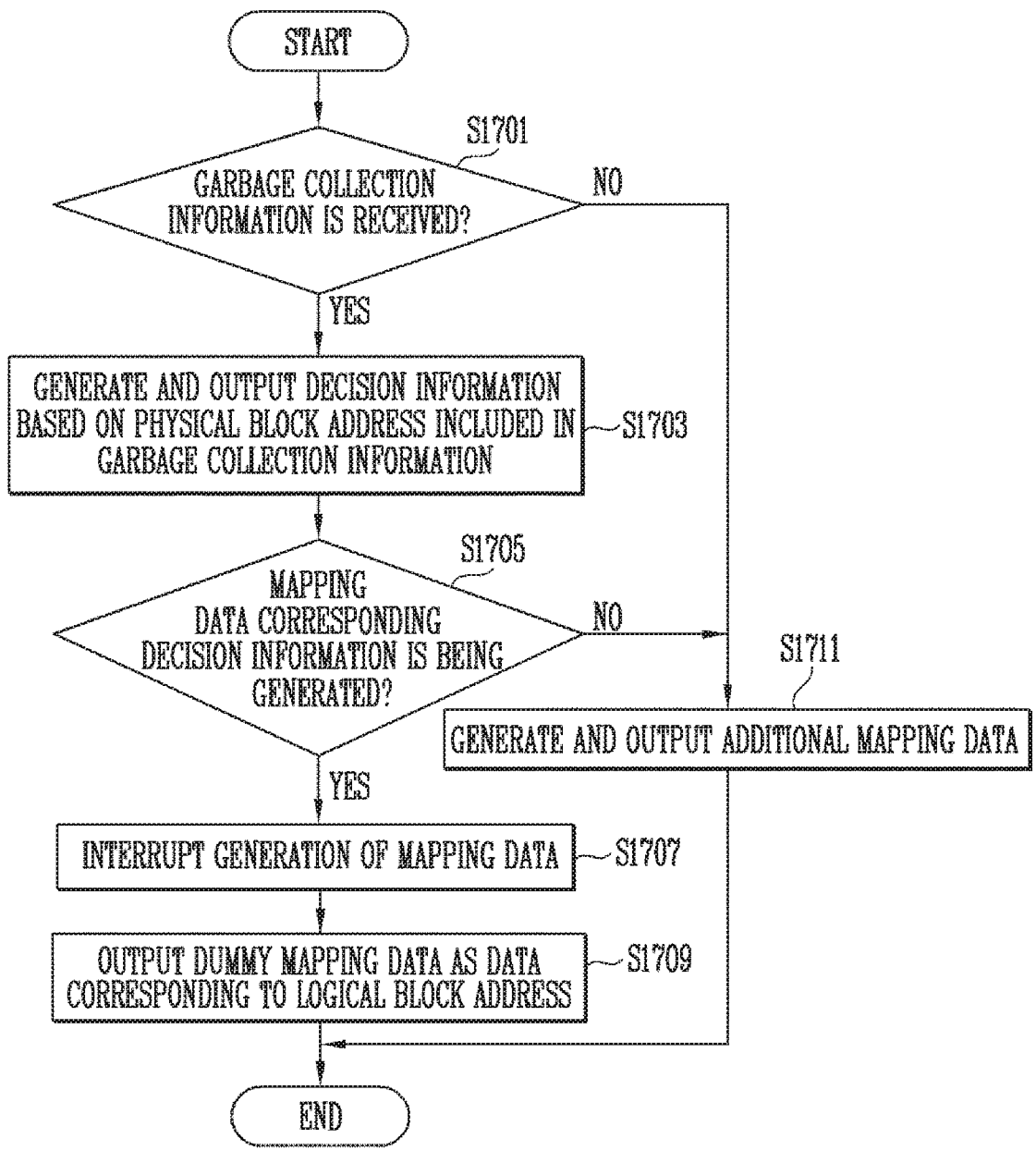
FIG. 17 is a diagram illustrating an operation of a memory controller in accordance with an embodiment of the present disclosure.

FIG. 17 is a diagram illustrating an operation of a memory controller (e.g., the memory controller 200 of FIGS. 2 and 7) in accordance with an embodiment of the present disclosure.

Referring to FIG. 17, at step S1701, it may be determined whether the request control unit 220 has received the garbage collection information GC_INF from the memory device 100. In various embodiments, while the mapping data control unit 230 generates additional mapping data in response to an additional mapping data request of the host 300, it may be determined whether the request control unit 220 has received the garbage collection information GC_INF.

The garbage collection may be performed by the firmware included in the memory controller 200. The memory controller 200 may perform a garbage collection operation to secure free blocks. The garbage collection operation may be an operation of moving valid page data of one memory block to another memory block and erasing the one memory block.

The memory device 100 may output garbage collection information GC_INF after the garbage collection operation has been completed. The garbage collection information GC_INF may include information about the completion of the garbage collection operation and physical block addresses on which the garbage collection operation has been performed. The garbage collection information GC_INF may include mapping information between physical block addresses, i.e., physical-to-physical (P2P) mapping information.

When it is determined that the request control unit 220 has received the garbage collection information GC_INF, the process proceeds to step S1703. When it is determined that the request control unit 220 has not received the garbage collection information GC_INF, the process proceeds to step S1711.

At step S1703, the request control unit 220 may generate and output decision information DC_INF based on a physical block address in the garbage collection information GC_INF.

When the request control unit 220 receives the garbage collection information GC_INF, the request control unit 220 may generate decision information DC_INF about logical block addresses having mapping relationships with respective physical block addresses in the garbage collection information GC_INF. The request control unit 220 may output the decision information DC_INF to the mapping data control unit 230.

At step S1705, the mapping data control unit 230 may determine whether mapping data corresponding to the decision information DC_INF is generated. In various embodiments, the mapping data control unit 230 may receive decision information DC_INF from the request control unit 220 during generation of the additional mapping data in response to the additional mapping data request of the host 300. At step S1705, it may be determined whether the logical block address in the additional mapping data that is being generated by the mapping data control unit 230 matches the logical block address in the decision information DC_INF.

When it is determined that the mapping data control unit 230 generates mapping data corresponding to the decision information DC_INF, the process proceeds to step S1707. When it is determined that the mapping data control unit 230 does not generate mapping data corresponding to the decision information DC_INF, the process proceeds to step S1711.

At step S1707, the mapping data control unit 230 may interrupt the generation of the mapping data. The mapping data control unit 230 may interrupt the generation of the additional mapping data.

During the generation of the additional mapping data, when the mapping data control unit 230 receives the decision information DC_INF generated from the request control unit 220 based on the garbage collection information GC_INF, the additional mapping data that is generated by the mapping data control unit 230 may no longer be valid. In the case where a garbage collection operation is performed on the memory device 100, the mapping relationship between the logical block address and the physical block address may be changed. Therefore, the mapping data control unit 230 may interrupt the generation of the additional mapping data because there is no need to generate the additional mapping data.

At step S1709, the mapping data control unit 230 may output dummy mapping data DM_DATA as data corresponding to the logical block address. The mapping data control unit 230 may interrupt the generation of the additional mapping data and generate dummy mapping data DM_DATA. The mapping data control unit 230 may generate the dummy mapping data DM_DATA in lieu of the additional mapping data. Furthermore, since the mapping data control unit 230 transmits the dummy mapping data DM_DATA to the host 300, the host 300 may not transmit, to the memory controller 200, a request which is based on incorrect mapping data.

At step S1711, the mapping data control unit 230 may generate and output additional mapping data. When the logical block address in the additional mapping data that is being generated by the mapping data control unit 230 is different from the logical block address in the decision information DC_INF, or when the request control unit 220 does not receive the garbage collection information GC_INF, the mapping data control unit 230 may generate the additional mapping data. The mapping data control unit 230 may not interrupt the generation of the additional mapping data. After the generation of the additional mapping data has been completed, the mapping data control unit 230 may output the additional mapping data to the host 300. The host 300 may store the additional mapping data in the host memory 310.

Figure 18:
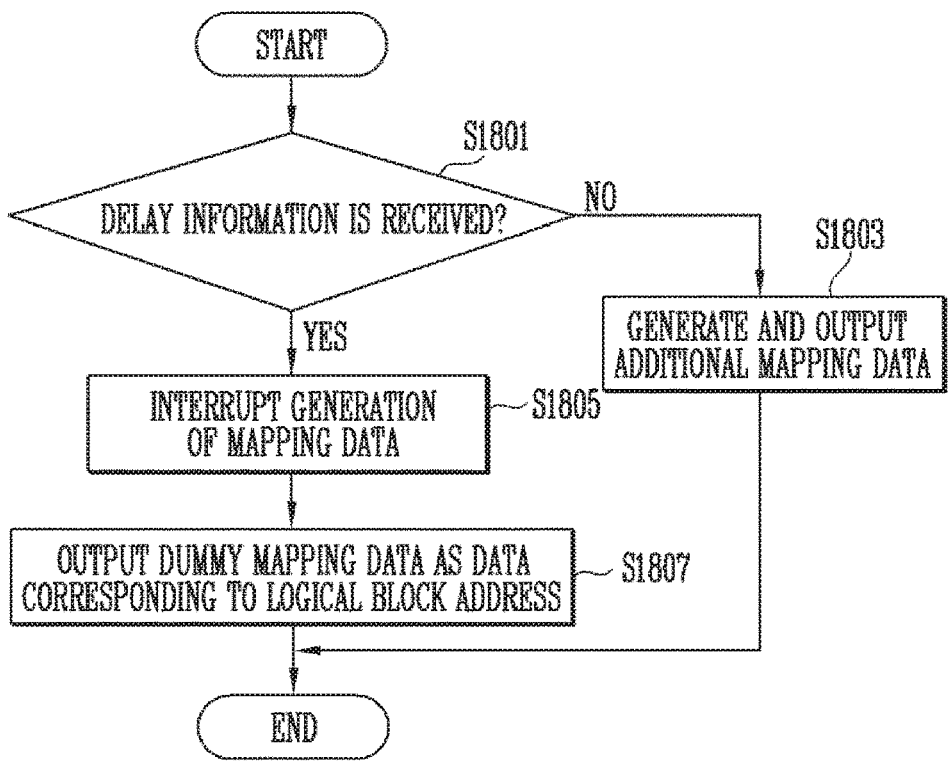
FIG. 18 is a diagram illustrating an operation of a memory controller in accordance with an embodiment of the present disclosure.

FIG. 18 is a diagram illustrating an operation of a memory controller (e.g., the memory controller 200 of FIGS. 2 and 8) in accordance with an embodiment of the present disclosure.

Referring to FIG. 18, at step S1801, it may be determined whether the mapping data control unit 230 has received delay information DELAY_INF during generation of additional mapping data. The delay information DELAY_INF may indicate that the additional mapping data may not be generated to perform an operation having a priority higher than that of the operation of generating the additional mapping data.

In various embodiment, the delay determination unit 240 in the memory controller 200 may detect a change in state of the memory controller 200. The change in state of the memory controller 200 may be determined based on priorities of operations to be performed by the memory controller 200. In the case where the memory controller 200 cannot generate additional mapping data because the memory controller 200 is performing another operation, the delay determination unit 240 may determine that the state of the memory controller 200 has been changed. When a change in state of the memory controller 200 is detected, the delay determination unit 240 may output delay information DELAY_INF to the mapping data control unit 230.

When it is determined that the mapping data control unit 230 does not receive the delay information DELAY_INF during the generation of the additional mapping data, the process proceeds to step S1803. When it is determined that the mapping data control unit 230 has received the delay information DELAY_INF during the generation of the additional mapping data, the process proceeds to step S1805.

At step S1803, the mapping data control unit 230 may generate the additional mapping data and output the additional mapping data to the host 300. When it is determined that the mapping data control unit 230 does not receive the delay information DELAY_INF during the generation of the additional mapping data, the mapping data control unit 230 may generate the additional mapping data. The mapping data control unit 230 may not interrupt the generation of the additional mapping data. After the generation of the additional mapping data has been completed, the mapping data control unit 230 may output the additional mapping data to the host 300. The host 300 may store the additional mapping data in the host memory 310.

At step S1805, the mapping data control unit 230 may interrupt the generation of the mapping data. The mapping data control unit 230 may interrupt the generation of the additional mapping data. In various embodiments, when it is determined that the mapping data control unit 230 receives delay information DELAY_INF from the delay determination unit 240 during the generation of the additional mapping data, the mapping data control unit 230 may interrupt the generation of the additional mapping data depending on operational priorities of the memory controller 200. Therefore, the mapping data control unit 230 may not generate the additional mapping data.

At step S1807, the mapping data control unit 230 may output dummy mapping data DM_DATA as data corresponding to the logical block address. The mapping data control unit 230 may interrupt the generation of the additional mapping data, and may generate dummy mapping data DM_DATA and output the dummy mapping data DM_DATA to the host 300. The mapping data control unit 230 may generate the dummy mapping data DM_DATA in lieu of the additional mapping data.

Figure 19:
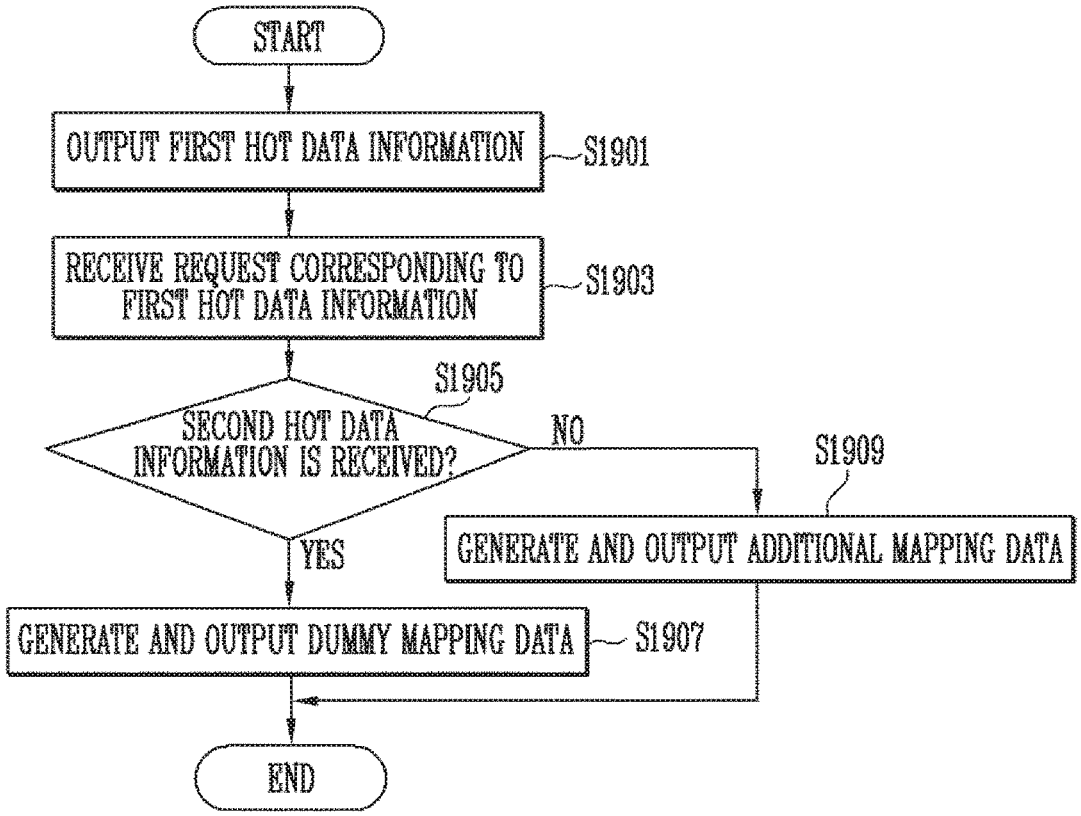
FIG. 19 is a diagram illustrating an operation of a memory controller in accordance with an embodiment of the present disclosure.

FIG. 19 is a diagram illustrating an operation of a memory controller (e.g., the memory controller 200 of FIGS. 2 and 9) in accordance with an embodiment of the present disclosure.

Referring to FIG. 19, at step S1901, the hot data information storage unit 210 may output first hot data information HD_INF1 to the host 300. The hot data information storage unit 210 may store hot data information HD_INF. The hot data information HD_INF may include information about logical block addresses LBA received a predetermined number of times or more from the host 300. The first hot data information HD_INF1 may be hot data information to be first output to the host.

At step S1903, the request control unit 220 may receive a request corresponding to the first hot data information HD_INF1 from the host 300. The host 300 may output a request related to the logical block address in the first hot data information HD_INF1 to the memory controller 200. The request for generating mapping data including a logical block address in the first hot data information HD_INF1 may be an additional mapping data request. Therefore, the request of the host 300 that is output based on the first hot data information HD_INF1 may be an additional mapping data request.

At step S1905, it may be determined whether the request control unit 220 has received second hot data information HD_INF2. In various embodiments, when it is determined that the hot data information HD_INF is changed, the first hot data information HD_INF1 may be updated to the second hot data information HD_INF2. Therefore, logical block addresses in the second hot data information HD_INF2 may be different from logical block addresses in the first hot data information HD_INF1. The hot data information storage unit 210 may store the second hot data information HD_INF2. The hot data information storage unit 210 may provide the second hot data information HD_INF2 to the request control unit 220.

When it is determined that the request control unit 220 has received the second hot data information HD_INF2, the process proceeds to step S1907. When it is determined that the request control unit 220 has not received the second hot data information HD_INF2, the process proceeds to step S1909.

At step S1907, the mapping data control unit 230 may generate dummy mapping data DM_DATA and output the dummy mapping data DM_DATA to the host 300. In various embodiments, the request control unit 220 may receive the updated second hot data information HD_INF2 from the hot data information storage unit 210. The request control unit 220 may generate decision information DC_INF including information about logical block addresses in the second hot data information HD_INF2. The decision information DC_INF generated by the request control unit 220 may be output to the mapping data control unit 230.

The mapping data control unit 230 may receive the decision information DC_INF from the request control unit 220 during the generation of the additional mapping data. The decision information DC_INF may include information about logical block addresses in the second hot data information HD_INF2. When the mapping data control unit 230 receives the decision information DC_INF, the mapping data control unit 230 may determine whether the logical block address in the additional mapping data that is being generated matches any one of the logical block addresses in the decision information DC_INF.

When the logical block address in the additional mapping data that is being generated matches any one of the logical block addresses in the decision information DC_INF, the mapping data control unit 230 may interrupt the generation of the additional mapping data. The mapping data control unit 230 may interrupt the generation of the additional mapping data and generate dummy mapping data DM_DATA. The mapping data control unit 230 may output the dummy mapping data DM_DATA to the host 300.

At step S1909, the mapping data control unit 230 may generate additional mapping data and output the additional mapping data to the host 300. When the mapping data control unit 230 does not receive the decision information DC_INF generated based on the second hot data information HD_INF2 during the generation of the additional mapping data, the mapping data control unit 230 may generate the additional mapping data. The mapping data control unit 230 may not interrupt the generation of the additional mapping data. After the generation of the additional mapping data has been completed, the mapping data control unit 230 may output the additional mapping data to the host 300. The host 300 may store the additional mapping data in the host memory 310.

Figure 20:
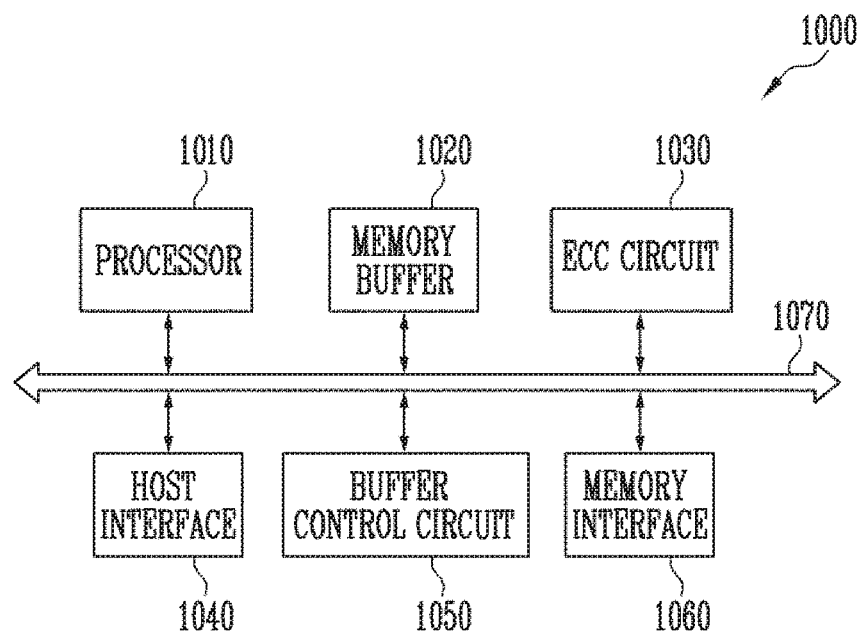
FIG. 20 is a diagram illustrating a memory controller in accordance with an embodiment of the present disclosure.

FIG. 20 is a diagram illustrating a memory controller in accordance with an embodiment of the present disclosure, for example, the memory controller 1000 of FIG. 1.

The memory controller 1000 is coupled to a host (e.g., the host 300 of FIG. 1) and a memory device (e.g., the memory device 100 of FIG. 1). In response to a request from the host 300, the memory controller 1000 may access the memory device 100. For example, the memory controller 1000 may control a write operation, a read operation, an erase operation, and a background operation of the memory device 100. The memory controller 1000 may provide an interface between the memory device 100 and the host 300. The memory controller 1000 may drive firmware for controlling the memory device 100.

Referring to FIG. 20, the memory controller 1000 may include a processor 1010, a memory buffer 1020, an error correction code (ECC) circuit 1030, a host interface 1040, a buffer control circuit 1050, a memory interface 1060, and a bus 1070.

The bus 1070 may provide a channel between the components of the memory controller 1000.

The processor 1010 may control the overall operation of the memory controller 1000 and perform a logical operation. The processor 1010 may communicate with the host 300 through the host interface 1040, and communicate with the memory device 100 through the memory interface 1060. In addition, the processor 1010 may communicate with the memory buffer 1020 through the buffer control circuit 1050. The processor 1010 may control the operation of the storage device by using the memory buffer 1020 as an operating memory, a cache memory, or a buffer memory.

The processor 1010 may perform the function of a flash translation layer (FTL). The processor 1010 may translate a logical block address (LBA), provided by the host 300, into a physical block address (PBA) through the FTL. The FTL may receive the LBA and translate the LBA into the PBA using a mapping table. An address mapping method using the FTL may be modified in various ways depending on the unit of mapping. Representative address mapping methods may include a page mapping method, a block mapping method, and a hybrid mapping method.

The processor 1010 may randomize data received from the host. For example, the processor 1010 may use a randomizing seed to randomize data received from the host 300. Randomized data may be provided to the memory device 100 as data to be stored, and may be programmed to the memory cell array.

During a read operation, the processor 1010 may derandomize data received from the memory device 100. For example, the processor 1010 may use a derandomizing seed to derandomize data received from the memory device 100. Derandomized data may be output to the host.

In an embodiment, the processor 1010 may drive software or firmware to perform the randomizing operation or the derandomizing operation.

The memory buffer 1020 may be used as an operating memory, a cache memory, or a buffer memory of the processor 1010. The memory buffer 1020 may store codes and commands to be executed by the processor 1010. The memory buffer 1020 may store data to be processed by the processor 1010. The memory buffer 1020 may include a static RAM (SRAM) or a dynamic RAM (DRAM).

The ECC circuit 1030 may perform error correction. The ECC circuit 1030 may perform an ECC encoding operation based on data to be written to the memory device 100 through the memory interface 1060. ECC encoded data may be transmitted to the memory device 100 through the memory interface 1060. The ECC circuit 1030 may perform an ECC decoding operation on data received from the memory device 100 through the memory interface 1060. For example, the ECC circuit 1030 may be included in the memory interface 1060 as a component of the memory interface 1060.

The host interface 1040 may communicate with the external host under control of the processor 1010. The host interface 1040 may perform communication using at least one of various communication methods such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), multiMedia card (MMC), an embedded MMC (eMMC), a dual in-line memory module (DIMM), a registered DIMM (RDIMM), and a load reduced DIMM (LRDIMM) communication methods.

The buffer control circuit 1050 may control the memory buffer 1020 under control of the processor 1010.

The memory interface 1060 may communicate with the memory device 100 under control of the processor 1010. The memory interface 1060 may communicate a command, an address, and data with the memory device 100 through the channel.

For example, the memory controller 1000 may include neither the memory buffer 1020 nor the buffer control circuit 1050.

For example, the processor 1010 may use codes to control the operation of the memory controller 1000. The processor 1010 may load codes from a nonvolatile memory device (e.g., a read only memory) provided in the memory controller 1000. Alternatively, the processor 1010 may load codes from the memory device 100 through the memory interface 1060.

For example, the bus 1070 of the memory controller 1000 may be divided into a control bus and a data bus. The data bus may transmit data in the memory controller 1000. The control bus may transmit control information such as a command and an address in the memory controller 1000. The data bus and the control bus may be separated from each other and may neither interfere with each other nor affect each other. The data bus may be coupled to the ECC circuit 1030, the host interface 1040, the buffer control circuit 1050, and the memory interface 1060. The control bus may be coupled to the processor 1010, the memory buffer 1020, the host interface 1040, the buffer control circuit 1050, and the memory interface 1060.

Figure 21:
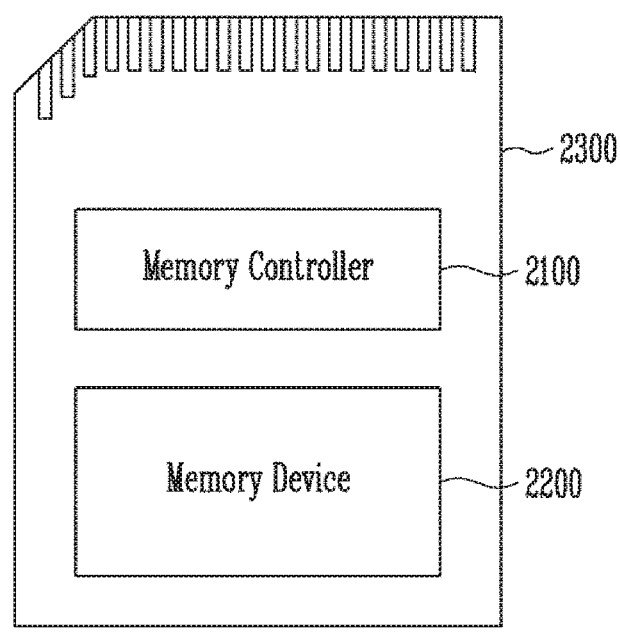
FIG. 21 is a block diagram illustrating a memory card system including a storage device in accordance with an embodiment of the present disclosure.

FIG. 21 is a block diagram illustrating a memory card system 2000 including a storage device in accordance with an embodiment of the present disclosure.

Referring FIG. 21, the memory card system 2000 may include a memory controller 2100, a memory device 2200, and a connector 2300.

The memory controller 2100 is coupled to the memory device 2200. The memory controller 2100 may access the memory device 2200. For example, the memory controller 2100 may control a read operation, a write operation, an erase operation, and a background operation of the memory device 2200. The memory controller 2100 may provide an interface between the memory device 2100 and a host (e.g., the host 300 of FIG. 1). The memory controller 2100 may drive firmware for controlling the memory device 2200. The memory device 2200 may be embodied in the same manner as that of the memory device 100 described with reference to FIG. 10.

In an embodiment, the memory controller 2100 may include components such as a random access memory (RAM), a processing unit, a host interface, a memory interface, and an ECC circuit.

The memory controller 2100 may communicate with an external device through the connector 2300. The memory controller 2100 may communicate with an external device (e.g., a host) based on a specific communication protocol. In an embodiment, the memory controller 2100 may communicate with the external device through at least one of various communication protocols such as universal serial bus (USB), multimedia card (MMC), embedded MMC (eMMC), peripheral component interconnection (PCI), PCI-express (PCI-e or PCIe), advanced technology attachment (ATA), serial-ATA (SATA), parallel-ATA (PATA), small computer small interface (SCSI), enhanced small disk interface (ESDI), integrated drive electronics (IDE), Firewire, universal flash storage (UFS), Wi-Fi, Bluetooth, and nonvolatile memory express (NVMe) protocols. In an embodiment, the connector 2300 may be defined by at least one of the above-described various communication protocols.

In an embodiment, the memory device 2200 may be implemented as any of various nonvolatile memory devices, such as an electrically erasable and programmable ROM (EEPROM), a NAND flash memory, a NOR flash memory, a phase-change RAM (PRAM), a resistive RAM (ReRAM), a ferroelectric RAM (FRAM), and a spin-torque magnetic RAM (STT-MRAM).

In an embodiment, the memory controller 2100 and the memory device 2200 may be integrated into a single semiconductor device to form a memory card. For example, the memory controller 2100 and the memory device 2200 may be integrated into a single semiconductor device to form a memory card such as a personal computer memory card international association (PCMCIA), a compact flash card (CF), a smart media card (e.g., SM or SMC), a memory stick, a multimedia card (e.g., MMC, RS-MMC, or MMC-micro), a secure digital (SD) card (e.g., SD, miniSD, microSD, or SDHC), or a universal flash storage (UFS).

Figure 22:
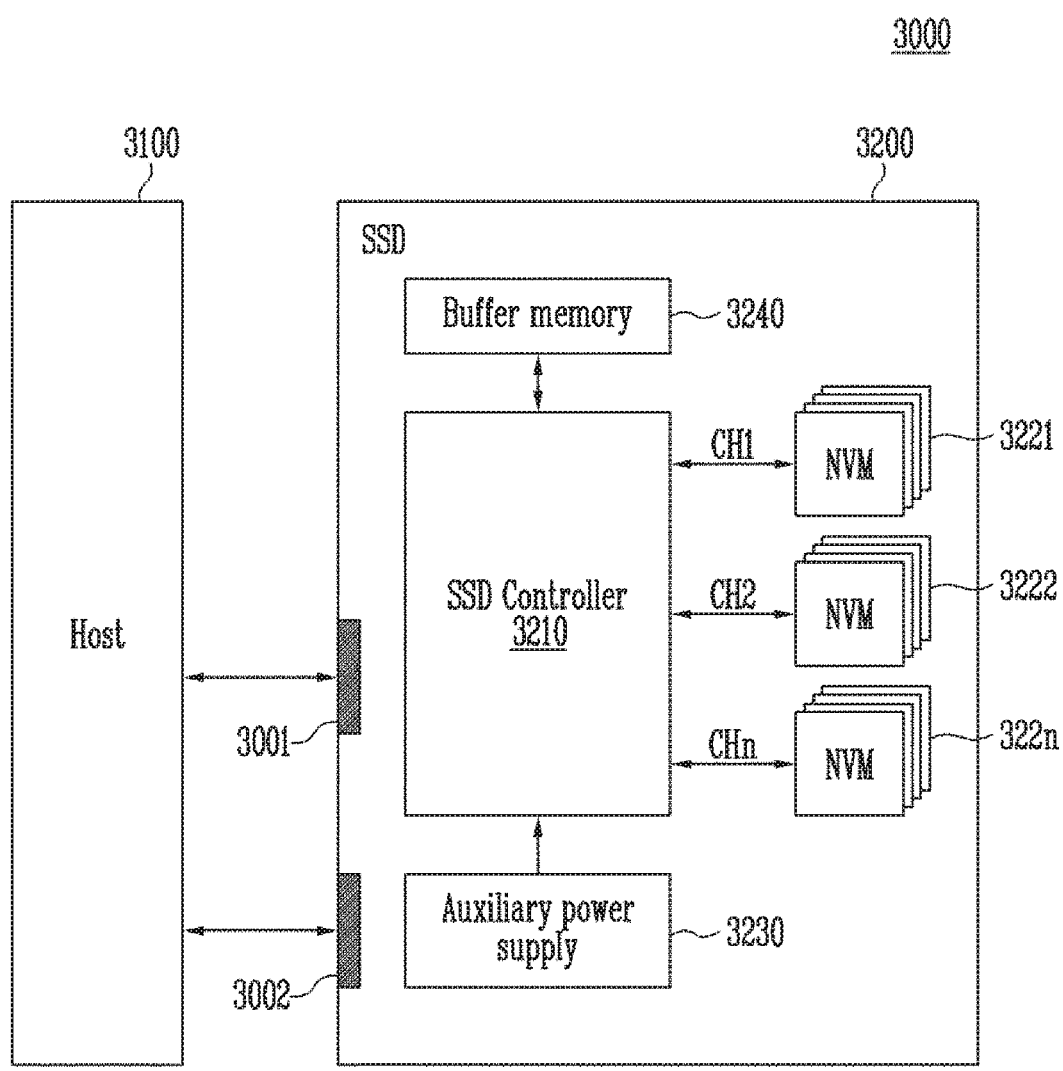
FIG. 22 is a block diagram illustrating a solid state drive (SSD) system including a storage device in accordance with an embodiment of the present disclosure.

FIG. 22 is a block diagram illustrating a solid state drive (SSD) system 3000 including a storage device in accordance with an embodiment of the present disclosure.

Referring to FIG. 22, the SSD system 3000 may include a host 3100 and an SSD 3200. The SSD 3200 may exchange signals SIG with the host 3100 through a signal connector 3001 and may receive power PWR through a power connector 3002. The SSD 3200 may include an SSD controller 3210, a plurality of flash memories 3221 to 322n, an auxiliary power supply 3230, and a buffer memory 3240.

In an embodiment, the SSD controller 3210 may perform the function of the memory controller 200, described above with reference to FIG. 1.

The SSD controller 3210 may control the plurality of flash memories 3221 to 322n in response to the signals SIG received from the host 3100. In an embodiment, the signals SIG may be signals based on an interface between the host 3100 and the SSD 3200. For example, the signals SIG may be signals defined by at least one of various interfaces such as universal serial bus (USB), multimedia card (MMC), embedded MMC (eMMC), peripheral component interconnection (PCI), PCI-express (PCI-e or PCIe), advanced technology attachment (ATA), serial-ATA (SATA), parallel-ATA (PATA), small computer small interface (SCSI), enhanced small disk interface (ESDI), integrated drive electronics (IDE), Firewire, universal flash storage (UFS), Wi-Fi, Bluetooth, and nonvolatile memory express (NVMe) interfaces.

The auxiliary power supply 3230 may be coupled to the host 3100 through the power connector 3002. The auxiliary power supply 3230 may be supplied with power PWR from the host 3100, and may be charged by the power PWR. The auxiliary power supply 3230 may supply the power of the SSD 3200 when the supply of power from the host 3100 is not smoothly performed. In an embodiment, the auxiliary power supply 3230 may be positioned inside the SSD 3200 or positioned outside the SSD 3200. For example, the auxiliary power supply 3230 may be disposed in a main board and may supply auxiliary power to the SSD 3200.

The buffer memory 3240 functions as a buffer memory of the SSD 3200. For example, the buffer memory 3240 may temporarily store data received from the host 3100 or data received from the plurality of flash memories 3221 to 322n or may temporarily store metadata (e.g., a mapping table) of the flash memories 3221 to 322n. The buffer memory 3240 may include volatile memories such as DRAM, SDRAM, DDR SDRAM, LPDDR SDRAM, and GRAM or nonvolatile memories such as FRAM, ReRAM, STT-MRAM, and PRAM.

Figure 23:
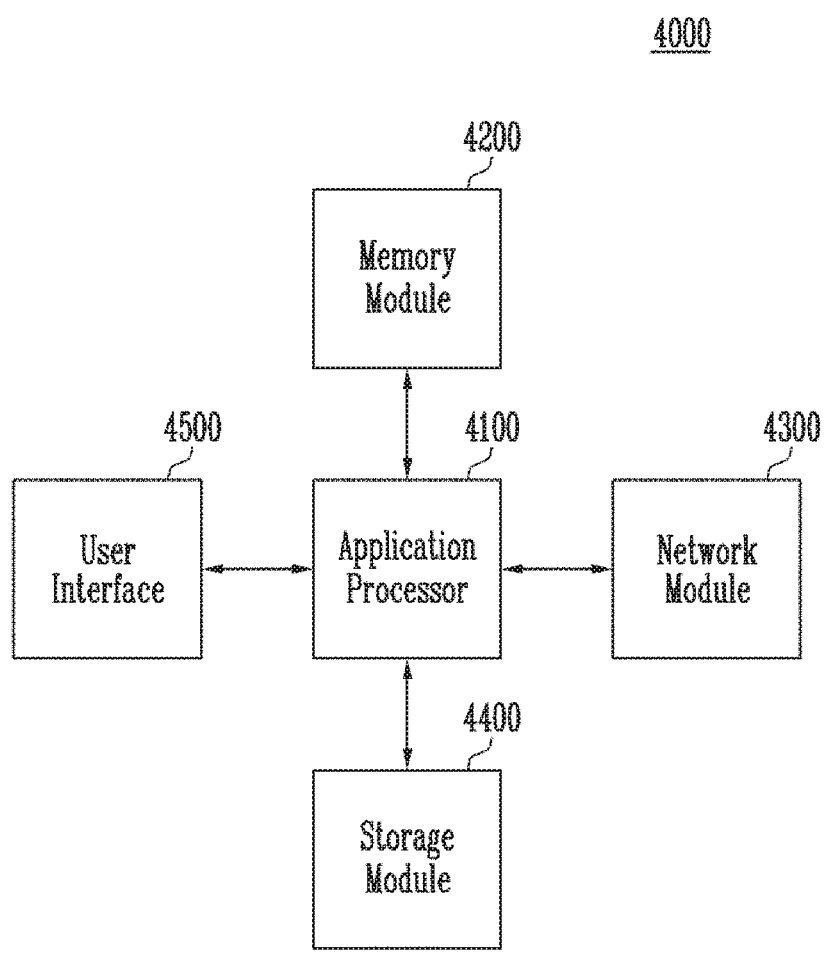
FIG. 23 is a block diagram illustrating a user system including a storage device in accordance with an embodiment of the present disclosure.

FIG. 23 is a block diagram illustrating a user system 4000 including a storage device in accordance with an embodiment of the present disclosure.

Referring to FIG. 23, the user system 4000 may include an application processor 4100, a memory module 4200, a network module 4300, a storage module 4400, and a user interface 4500.

The application processor 4100 may run components included in the user system 4000, an operating system (OS) or a user program. In an embodiment, the application processor 4100 may include controllers, interfaces, graphic engines, etc. for controlling the components included in the user system 4000. The application processor 4100 may be provided as a system-on-chip (SoC).

The memory module 4200 may function as a main memory, a working memory, a buffer memory, or a cache memory of the user system 4000. The memory module 4200 may include a volatile RAM such as a DRAM, an SDRAM, a DDR SDRAM, a DDR2 SDRAM, a DDR3 SDRAM, an LPDDR SDRAM, and an LPDDR3 SDRAM, or a nonvolatile RAM such as a PRAM, a ReRAM, an MRAM, and an FRAM. In an embodiment, the application processor 4100 and the memory module 4200 may be packaged based on package-on-package (POP) and may then be provided as a single semiconductor package.

The network module 4300 may communicate with external devices. For example, the network module 4300 may support wireless communication, such as code division multiple access (CDMA), global system for mobile communication (GSM), wideband CDMA (WCDMA), CDMA-2000, time division multiple access (TDMA), long term evolution (LTE), WiMAX, WLAN, UWB, Bluetooth, or Wi-Fi communication. In an embodiment, the network module 4300 may be included in the application processor 4100.

The storage module 4400 may store data therein. For example, the storage module 4400 may store data received from the application processor 4100. Alternatively, the storage module 4400 may transmit the data stored in the storage module 4400 to the application processor 4100. In an embodiment, the storage module 4400 may be implemented as a nonvolatile semiconductor memory device, such as a phase-change RAM (PRAM), a magnetic RAM (MRAM), a resistive RAM (RRAM), a NAND flash memory, a NOR flash memory, or a NAND flash memory having a three-dimensional (3D) structure. In an embodiment, the storage module 4400 may be provided as a removable storage medium (i.e., removable drive), such as a memory card or an external drive of the user system 4000.

In an embodiment, the storage module 4400 may include a plurality of nonvolatile memory devices, and each of the plurality of nonvolatile memory devices may be operated in the same manner as that of the memory device 100 described above with reference to FIGS. 10 to 13. The storage module 4400 may be operated in the same manner as that of the storage device 50 described above with reference to FIG. 1.

The user interface 4500 may include interfaces for inputting data or instructions to the application processor 4100, or outputting data to an external device. In an embodiment, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric device. The user interface 4500 may further include user output interfaces such as a liquid crystal display (LCD), an organic light emitting diode (OLED) display device, an active matrix OLED (AMOLED) display device, an LED, a speaker, and a motor.

As described above, various embodiments of the present disclosure may provide a memory controller capable of generating mapping data having improved reliability, and a method of operating the memory controller.

Although the embodiments of the present disclosure have been disclosed, those skilled in the art will appreciate that various modifications, additions and substitutions are possible, without departing from the scope and spirit of the present disclosure.

Therefore, the scope of the present disclosure must be defined by the appended claims and equivalents of the claims rather than by the description preceding them.

In the above-discussed embodiments, all steps may be selectively performed or skipped. In addition, the steps in each embodiment may not be always performed in regular order. Furthermore, the embodiments disclosed in the present specification and the drawings aim to help those with ordinary knowledge in this art more clearly understand the present disclosure rather than aiming to limit the bounds of the present disclosure. One of ordinary skill in the art to which the present disclosure belongs will be able to easily understand that various modifications are possible based on the technical scope of the present disclosure.

Embodiments of the present disclosure have been described with reference to the accompanying drawings, and specific terms or words used in the description should be construed in accordance with the spirit of the present disclosure without limiting the subject matter thereof. It should be understood that many variations and modifications of the basic inventive concept described herein will still fall within the spirit and scope of the present disclosure as defined in the appended claims and their equivalents.

What is claimed is:

1. A memory controller for controlling a memory device, the memory controller comprising:
   a request controller configured to generate first decision information that includes a first logical block address and type information indicating whether to generate dummy mapping data or additional mapping data including mapping data and field data; and
   a mapping data controller configured to, based on whether the first logical block address corresponds to a second logical block address in the additional mapping data, interrupt generation of the additional mapping data and to generate the dummy mapping data,
   wherein the mapping data includes mapping information between the second logical block address and a physical block address.

2. The memory controller according to claim 1,
   wherein the mapping data controller completes the generation of the additional mapping data when the first logical block address is different from the second logical block address.

3. The memory controller according to claim 1,
   wherein the request controller receives an operation request corresponding to the first logical block address from a host,
   wherein the operation request includes one of a program request and an erase request, and
   wherein the mapping data controller interrupts the generation of the additional mapping data and generates the dummy mapping data, when the first logical block address matches the second logical block address.

4. The memory controller according to claim 3,
wherein the request controller generates the first decision information in response to the operation request received from the host, and
wherein the mapping data controller determines whether the first logical block address corresponds to the second logical block address based on the first decision information.

5. The memory controller according to claim 1,
wherein the request controller receives a mapping data request corresponding to the second logical block address from a host and generates second decision information including the second logical block address and the type information in response to the mapping data request, and
wherein the mapping data controller generates the additional mapping data based on the second decision information.

6. The memory controller according to claim 5, further comprising a hot data information storage configured to store hot data information about logical block addresses received a predetermined number of times or more from the host during a preset period, and to output the hot data information to the host and the request controller.

7. The memory controller according to claim 6,
wherein the hot data information storage updates the hot data information in response to a variation of access frequency on the logical block addresses and outputs updated hot data information to the request controller.

8. The memory controller according to claim 7,
wherein the mapping data request is generated by the host based on the hot data information that is transmitted from the hot data information storage to the host and includes the second logical block address,
wherein the request controller generates the first decision information in response to the updated hot data information including the first logical block address, received from the hot data information storage, and
wherein the mapping data controller interrupts the generation of the additional mapping data and generates the dummy mapping data, based on the first decision information.

9. The memory controller according to claim 1,
wherein the request controller receives garbage collection information including the first logical block address on which a garbage collection is performed from the memory device and generates the first decision information, and
wherein the mapping data controller interrupts the generation of the additional mapping data and generates the dummy mapping data, based on the first decision information.

10. The memory controller according to claim 1, further comprising a delay controller configured to detect a change in a state of the memory controller depending on whether an operation performed by the memory controller has a higher priority than the generation of the additional mapping data, and to generate delay information indicating that the generation of the additional mapping data is delayed or interrupted.

11. The memory controller according to claim 10,
wherein the mapping data controller interrupts the generation of the additional mapping data and generates the dummy mapping data in response to the delay information.

12. The memory controller according to claim 1, wherein the additional mapping data further includes at least one of an update count of the mapping information and error correction data for the mapping information.

13. A method of operating a memory controller for controlling a memory device, the method comprising:
generating additional mapping data including mapping data and field data;
receiving a first logical block address during generation of the additional mapping data; and
interrupting the generation of the additional mapping data, based on whether the first logical block address corresponds to a second logical block address; and
generating dummy mapping data,
wherein the mapping data includes mapping information indicating a mapping relationship between the second logical block address and a physical block address.

14. The method according to claim 13, wherein the receiving the first logical block address comprises receiving the first logical block address and an operation request corresponding to the first logical block address from a host, and
wherein the operation request includes one of a program request and an erase request.

15. The method according to claim 13, further comprising completing the generation of the additional mapping data when the first logical block address is different from the second logical block address.

16. The method according to claim 13, further comprising receiving the second logical block address and a mapping data request corresponding to the second logical block address from a host.

17. The method according to claim 13, wherein the receiving the first logical block address comprises receiving garbage collection information including the first logical block address on which a garbage collection is performed from the memory device.

18. The method according to claim 13, further comprising:
updating hot data information about logical block addresses received a predetermined number of times or more from a host during a preset period, in response to a variation of access frequency on the logical block addresses; and
interrupting the generation of the additional mapping data in response to updated hot data information including the first logical block address.

19. The method according to claim 13, further comprising:
detecting a change in a state of the memory controller based on whether an operation performed by the memory controller has a higher priority than the generation of the additional mapping data; and
interrupting the generation of the additional mapping data in response to a detection of the change in the state of the memory controller.

20. The method according to claim 13, wherein the additional mapping data further includes at least one of an update count of the mapping information and error correction data for the mapping information.

* * * * *